(12) United States Patent
Inoue et al.

(10) Patent No.: US 7,940,604 B2
(45) Date of Patent: May 10, 2011

(54) DIAL INDICATOR DISPLAY DEVICE

(75) Inventors: Katsutoyo Inoue, Nagano-ken (JP); Akiko Obara, Nagano-ken (JP); Keiko Okayasu, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 548 days.

(21) Appl. No.: 11/960,205

(22) Filed: Dec. 19, 2007

(65) Prior Publication Data

US 2008/0151700 A1 Jun. 26, 2008

(30) Foreign Application Priority Data

Dec. 21, 2006 (JP) ................................. 2006-344449
Aug. 31, 2007 (JP) ................................. 2007-226681

(51) Int. Cl.
*G04B 19/04* (2006.01)
*G04C 19/00* (2006.01)
(52) U.S. Cl. ............................. 368/80; 368/82; 368/223
(58) Field of Classification Search .................... 368/80, 368/82, 239, 223; 116/308–310, 290–292
See application file for complete search history.

(56) References Cited

U.S. PATENT DOCUMENTS

| | | | | |
|---|---|---|---|---|
| 4,355,380 A | * | 10/1982 | Huguenin et al. | 368/71 |
| 4,488,818 A | * | 12/1984 | Saurer et al. | 368/71 |
| 4,775,964 A | * | 10/1988 | Alessio et al. | 368/67 |
| 5,936,914 A | * | 8/1999 | Yamaguchi et al. | 368/205 |
| 7,035,170 B2 | * | 4/2006 | Narayanaswami et al. | 368/223 |
| 7,215,601 B2 | * | 5/2007 | Plancon et al. | 368/10 |

FOREIGN PATENT DOCUMENTS

| | | |
|---|---|---|
| EP | 1152305 A1 | 11/2001 |
| JP | 58-060282 | 4/1983 |
| JP | 2006242717 | 9/2006 |
| JP | 2007057274 | 3/2007 |
| JP | 2007057292 | 3/2007 |

* cited by examiner

Primary Examiner — Vit W Miska

(57) ABSTRACT

A dial indicator display device according has a needle indicator; a needle moving means for moving the needle indicator; a display panel disposed behind the needle indicator and capable of displaying an image; and a drive control means for controlling the needle moving means and driving the display panel. The drive control means includes a scale display control means for displaying a scale in a scale display area on the display panel overlapping the range of needle movement in plan view, a needle position detection means for detecting the position of the needle indicator, and an information display means. The scale display control means segments the scale display area into a scale area and a no-scale area not including the scale area based on the needle position detected by the needle position detection means, and displays a scale for reading values indicated by the needle indicator only in the scale area, and the information display means displays information in the no-scale area.

5 Claims, 15 Drawing Sheets

DIAL INDICATOR DISPLAY DEVICE

CROSS-REFERENCE TO RELATED APPLICATIONS

Japanese Patent applications No.(s) 2006-344449 and 2007-226681 are hereby incorporated by reference in their entirety.

BACKGROUND

1. Field of Invention

The present invention relates generally to a dial indicator display device for indicating information using analog hands or needle indicators, and relates more particularly to a dial indicator display device that is used, for example, in timepieces for indicating the time and in meters for indicating a measured value.

2. Description of Related Art

Dial indicator display devices that use hands or needles to indicate information, that is, analog display devices, are commonly used in analog timepieces, thermometers, pressure gauges, speedometers, and other types of instrumentation and measuring devices. This type of analog display device has one or more hands and a dial bearing the graduations of the scale located behind the hand (like the dial of a clock).

An example of this type of display device is the information display device that renders the dial using a display device such as a liquid crystal display device as taught in Japanese Unexamined Patent Appl. Pub. JP-A-2006-242717.

This information display device displays the time using an hour hand and minute hand, and displays auxiliary information using the display device. As the hour hand and minute hand move with the time, this information display device moves where the auxiliary information is displayed on the display device so that the hour hand and minute hand and the displayed information do not overlap, thereby improving the readability of the displayed information.

A problem common to the timepiece taught in JP-A-2006-242717 and conventional analog timepieces is that while the numbers shown on the dial are used to read to value indicated by the hour hand and minute hand, reading the indicated value when a hand is positioned between two numbers is more difficult. This loss of readability is particularly a problem with measuring instruments and meters that require accurately reading the indicated value.

The timepiece taught in JP-A-2006-242717 only has an hour hand and a minute hand. If a second hand is added the display position of the auxiliary information must be moved frequently, thus reducing readability and increasing power consumption as a result of frequently changing the display. If this information display device is used in a wristwatch or other battery-powered device, increased power consumption creates the problem of a shorter battery life.

SUMMARY

A first object of the invention is therefore to provide a dial indicator display device that improves the readability of values indicated by the hands.

A second object of the invention is to provide a dial indicator display device that improves the readability of both the values indicated by the hands and the information displayed on the display panel when information is displayed on the display panel.

A third object of the invention is to provide a dial indicator display device that improves the readability of both the values indicated by the hands and the information displayed on the display panel when the hands include an hour hand, a minute hand, and a second hand.

A dial indicator display device according to a first aspect of the invention has a needle indicator; a needle moving means for moving the needle indicator; a display panel disposed behind the needle indicator and capable of displaying an image; and a drive control means for controlling the needle moving means and driving the display panel. The drive control means includes a scale display control means for displaying a scale in a scale display area on the display panel overlapping the range of needle movement in plan view, a needle position detection means for detecting the position of the needle indicator, and an information display means. The scale display control means segments the scale display area into a scale area and a no-scale area not including the scale area based on the needle position detected by the needle position detection means, and displays a scale for reading values indicated by the needle indicator only in the scale area, and the information display means displays information in the no-scale area.

The needle moving means that moves the needle indicator can use a drive means such as a stepping motor and a wheel train that is driven rotationally by the drive means. The needle moving means is not limited to moving the needle indicator rotationally, and a device that causes the needle indicator to slide linearly can be used.

Various types of display devices can be used for the display panel, including liquid crystal displays, organic EL (electroluminescent) displays, and EPD (electrophoretic display) devices. If the display panel displays only a scale and numbers for the needle indicator, a segment drive display can be used. However, if a matrix drive display panel is used, numbers, letters, and other types of information can be freely displayed in addition to a scale.

If the area over which the needle indicator can move is projected onto the surface of the display panel, the scale display area that overlaps the part of the display panel over which the needle indicator moves when seen in plan view means that the scale display area is formed to include this projection. The scale display area is normally set to the same shape and size as the range of needle indicator movement.

A dial indicator display device having a needle indicator and a display panel according to this aspect of the invention sets a scale area according to the position of the needle indicator in the scale display area, displays a scale for reading the values indicated by the needle indicator in this scale area, and can therefore display a scale appropriate to the current position of the indicator. More particularly, because scale areas are set according to the position of each needle indicator, the scales can be set for each indicator according to the length of the indicator when there are plural needle indicators of different lengths, such as the hour hand and minute hand of a timepiece. The scale can therefore be displayed at a position that makes reading the value indicated by the needle easy, such as at the distal end of the indicator or a position overlapped by the indicator, can therefore improve the readability of the needle indicator, and thus achieve the first object of the invention.

Furthermore, because a scale is only displayed in the scale area, a scale is not displayed in the no-scale area, and the information display means can use this no-scale area to display information. Compared with a conventional timepiece having a scale displayed encircling the dial, the scale display area is smaller, an accordingly larger no-scale area can be reserved, and other information can be easily displayed in the no-scale area at a position over which the needle indicator does not move when seen in plan view. The readability of the values indicated by the hand or needle, and the readability of information displayed on the display panel, can be improved, and the second object of the invention can also be achieved.

If the indicator is driven rotationally, the scale area can be set in a band that curves along the distal end part of the hand, that is, in an arc, and the no-scale area can be set on the inside of the scale area. Because part of the no-scale area will overlap an area on the pivot pin side of the indicator in this case, the information display means displays the information in the part of the no-scale area that is not covered by the indicator.

Preferably, the no-scale area is also disposed on the outside circumference side of the scale display area on the display panel, and the information display means also displays information in the no-scale area disposed on the outside circumference side of the scale area.

If the dial indicator display device is a timepiece, the information preferably includes letters or pictures related to the time. Examples of such information include schedule information displayed as text, and scheduled time information displayed as a time band.

The needle indicator is generally of the type that moves in one direction around a rotary pin, such as the hour, minute, and second hands of a timepiece, or the type that pivots on a rotary pin such as the needle of a speedometer in an automobile. The area of movement of such hands or needle indicators, that is, the scale display area, can be a flat circle or fan-shaped area.

The display panel, however, generally has a rectangular display area. Such display panels also have a display area outside of the scale display area. This aspect of the invention also uses the area on the outside circumference side of the scale display area as the no-scale area for displaying information by means of the information display means, and can therefore increase the area that can be used to display information.

Furthermore, because a no-scale area is also set outside the scale display area, the information display means can also display information in the area in line with an extension of the indicator. Time-related information, such as the schedule information, can therefore be displayed beside the portion of the scale related to that time so that the information is more readable and useful.

Further preferably, the needle indicator is attached to a rotary pin that is driven rotationally by the needle moving means, the scale display area is formed in a circle concentric to the rotary pin of the needle indicator, and the scale area is a fan-shaped portion of the scale display area connecting an outside circumference arc of the scale display area and the center of the circle.

This arrangement enables displaying the scale along the path of the distal end of the indicator in a dial indicator display device having a needle indicator that moves in circle, such as the hour hand and minute hand of a timepiece, and the readability of the rotary indicator can be improved.

Further preferably, the scale area has a center angle set in the range from 30 degrees to 270 degrees.

If the center angle is less than 30 degrees, the number of graduations that can be displayed on the scale is limited and the readability of the indicator is reduced compared with a scale area having a center angle of more than 30 degrees. In addition, if the center angle is greater than 270 degrees, the size of the no-scale area is small, thus reducing the size of the available display area when the no-scale area is used to display information, and the readability of the displayed information is reduced compared with when the center angle is less than or equal to 270 degrees.

However, by setting the center angle between 30 degrees and 270 degrees, a scale equal to the range covered by the needle indicator moving 30 degrees can be displayed. The readability of the indicator and scale can thus be assured, a sufficiently large no-scale area can be assured, and the readability of information displayed in the no-scale area can be improved.

Further preferably, the needle indicator includes two or three hands disposed to concentric rotary pins, and the scale area has a center angle set in the range from 30 degrees to 90 degrees.

If the center angle is less than 30 degrees, the number of graduations that can be displayed on the scale is limited and the readability of the indicator is reduced compared with a scale area having a center angle of more than 30 degrees. In addition, if the center angle is greater than 90 degrees, the size of the available information display area is greatly reduced because a scale area is displayed for each hand.

However, by setting the center angle between 30 degrees and 90 degrees, a scale equal to the range covered by the needle indicator moving 30 degrees can be displayed. The readability of the indicator and scale can thus be assured. A sufficiently large no-scale area can also be assured, and the readability of information displayed in the no-scale area can be improved, even when there are two or three hands.

Further preferably, the display panel of the dial indicator display device is a display device with image memory, the drive control means runs a refresh display operation to correct for image degradation on the display panel at a prescribed refresh display interval, and the scale display control means moves the scale area a prescribed amount that is set according to the refresh display interval in the same direction as the needle indicator moves at the same interval as the refresh display interval.

A display device with image memory is a display element that continues to display the same content for a certain period of time even when power is not supplied, such as an electrophoretic display (EPD) device, which is also known as electronic paper.

A display device with image memory continues to display the same content for a certain period of time when power is not supplied, but the image contrast tends to gradually drop. Display contrast can be improved by supplying power after a prescribed time has passed even if the displayed content does not change. The drive operation supplying this power to compensate for degradation of the displayed image is called a refresh display operation. The refresh display interval can therefore be set desirably according to the type of display device and the drive method.

Using a display device with image memory for the display panel greatly reduces the power consumption required to maintain the display, extend the battery life and operating time in a portable timekeeping device such as a wristwatch, reduce the need for battery replacement or recharging, and thus improve convenience.

Furthermore, updating or refreshing the display of a display device with image memory consumes power, and power consumption can be reduced by increasing the refresh display interval. Power consumption can therefore be reduced accordingly by increasing the interval at which the scale and information displays are refreshed or updated.

Furthermore, because the scale display control means updates the scale area at the same interval as the refresh display interval, the scale area can be updated and the refresh display operation executed at the same time. The number of times power is supplied can therefore be reduced compared with executing these two operations at different times, and power consumption can be reduced accordingly.

Furthermore, because the scale area is moved a prescribed distance that is set according to the refresh display interval, the scale area can be moved according to how far the indicator has moved at the refresh display interval, and the scale can therefore always be displayed at the position of the indicator. If the refresh display interval is 15 minutes, for example, the hand and the scale can always be displayed together by moving the scale areas the amount the corresponding hands move in 15 minutes.

Further preferably, the dial indicator display device also has a timekeeping means for keeping time, the needle indicator includes an hour hand and a minute hand, the drive control means controls the needle moving means based on the time information kept by the timekeeping means to move the hour hand and the minute hand, the scale display control means sets an hour hand scale area for the hour hand and a minute hand scale area for the minute hand, and displays a scale in each scale area, and the drive control means changes the refresh display interval based on the time kept by the timekeeping means.

This type of dial indicator display device (timepiece) can improve the readability of the hour and minute time information, can display other information, such as date information, the weekday, or world time information, in the no-scale area, and can improve the readability of the displayed information.

A timepiece according to the present invention thus combines the benefit of an analog timepiece that uses hands for intuitively reading the time with the benefit of a digital timepiece that can display other information such as the date, weekday, and world time while improving the readability of the hands and the displayed information, thus affording an extremely convenient timepiece.

Furthermore, because the display panel also functions as the dial of the timepiece, the thickness of the timepiece can be reduced and a thin timepiece can be achieved.

In addition, because the refresh display interval can be changed based on the time kept by the timekeeping means, the length of the refresh display interval can be controlled according to how the user uses the timepiece, and power consumption can be further reduced.

A wristwatch, for example, is typically removed from the wrist and is not used at night (such as between 11:00 p.m. and 7:00 a.m.). A drop in contrast in the displayed scale at night is therefore not a practical problem, and power consumption can be reduced by using a longer refresh display interval at night than during the day.

The scale area can be set to display a scale corresponding to the movement of the hand during at least the refresh display interval. For example, if the refresh display interval is 15 minutes during the day and 30 minutes at night, the minute hand scale area during the day is large enough to display a 15-minute scale (that is, a scale area with a 90 degree center angle), and the minute hand scale area at night is large enough to display at least a 30-minute scale (that is, a scale area with a 180 degree center angle).

Further preferably, when the needle indicator moves a prescribed number of graduations, the scale display control means moves the scale area the prescribed number of graduations in the direction of needle indicator movement.

The prescribed number of graduations can be one graduation or two or more graduations. If the dial indicator display device is a timepiece, for example, the minute hand scale preferably has from four to 30 graduations, and the prescribed number of graduations is preferably the number of graduations covered in the refresh display interval.

This aspect of the invention changes the scale in conjunction with hand movement, and can therefore always display the hand (indicator) in the middle of the displayed scale. The value indicated by the hand can therefore be approximated from the displayed scale, and it is therefore easier to intuit the indicated value. When movement of the needle indicator cannot be predicted, such as with an instrumentation meter, this aspect of the invention enables the user to determine the position of the needle indicator from the scale and thus makes it easier to read the indicated value.

Further preferably, when the needle indicator moves to an end of the scale area, the scale display control means moves the scale area a prescribed distance in the direction of needle indicator movement.

When thus arranged the scale area moves whenever the needle indicator moves to the end of the displayed scale area, the same scale can therefore be displayed until the indicator reaches the end of the scale area, and the scale area setting can be changed, that is, the scale display can be updated, less frequently.

Therefore, when a display device with memory, such as an electrophoretic display, is used as the display panel, the display can be updated less frequently and power consumption can therefore be reduced.

This aspect of the invention can be effectively used to reduce the display update frequency and reduce power consumption in devices such as thermometers because the indicator moves in small increments and timepieces because the hands move at a constant rate.

In another aspect of the invention the scale display control means moves the scale area a prescribed distance in the direction of needle indicator movement at a constant time interval.

If the indicator moves at a constant speed, such as the hands of a timepiece, the scale area can reliably track movement of the indicator by moving the scale area at a constant time interval. The scale can also be updated less frequently by appropriately setting the interval at which the scale area is moved. As a result, the display can be updated less frequently and power consumption can be reduced when the display panel is a display device with image memory such as an electrophoretic display.

The dial indicator display device according to another aspect of the invention has a timekeeping means for keeping time, the needle indicator includes an hour hand and a minute hand, the drive control means controls the needle moving means based on the time information kept by the timekeeping means to move the hour hand and the minute hand, and the scale display control means sets an hour hand scale area for the hour hand and a minute hand scale area for the minute hand, and displays a scale in each scale area. More specifically, the dial indicator display device of the invention is preferably a timepiece.

This type of dial indicator display device (timepiece) can improve the readability of the hour and minute time information, can display other information, such as date information, the weekday, or world time information, in the no-scale area, and can improve the readability of the displayed information.

A timepiece according to the present invention thus combines the benefit of an analog timepiece that uses hands for intuitively reading the time with the benefit of a digital timepiece that can display other information such as the date, weekday, and world time while improving the readability of the hands and the displayed information, thus affording an extremely convenient timepiece.

Furthermore, because the display panel also functions as the dial of the timepiece, the thickness of the timepiece can be reduced and a thin timepiece can be achieved.

Further preferably, the scale display control means displays the scale displayed in the hour hand scale area in the area inside of the scale displayed in the minute hand scale area.

Because the hour hand is shorter than the minute hand, the distal end of the hour hand is typically relatively far from the scale on the dial in a typical timepiece. By displaying the hour hand scale inside of the minute hand scale, this aspect of the invention displays the hour hand scale close to the hour hand and can improve the readability of the hour hand.

Further preferably, the scale display control means sets the hour hand scale area and the minute hand scale area contiguously to each other, and displays the scale in each scale area equidistantly from the rotary pin of the needle indicators when the angle formed by the hour hand and minute hand and detected by the needle position detection means is less than or equal to a prescribed angle, and sets the scale displayed in the hour hand scale area in the area on the inside of the scale displayed in the minute hand scale area when the angle formed by the hour hand and minute hand and detected by the needle position detection means is greater than a prescribed angle.

If the hour hand and minute hand scale areas are contiguous and the scales for the hands are contiguous when the prescribed angle formed by the hour hand and minute hand is less than or equal to 90 degrees, for example, the scales can be updated less frequently and power consumption can be further reduced.

Yet further preferably, the needle indicator includes a second hand, the drive control means controls the needle moving means based on time information kept by the timekeeping means to move the hour hand, minute hand, and second hand, and the scale display control means sets a second hand scale area for the second hand, and displays the scale displayed in the second hand scale area in the area on the inside of the scale displayed in the hour hand scale area.

This arrangement enables indicating the hour, minute, and second of the time by means of the hour hand, minute hand, and second hand, and the user can therefore intuit the current time to the second from the hands. Furthermore, because the second hand scale is displayed inside of the hour hand scale, the second hand scale can be prevented from affecting displaying information in the no-scale area.

Furthermore, if the second hand is shorter than the hour hand and the minute hand, the possibility of the second hand overlapping information displayed in the no-scale area is reduced and a drop in the readability of the displayed information can be prevented.

In another aspect of the invention the needle indicator includes a second hand, the drive control means controls the needle moving means based on time information kept by the timekeeping means to move the hour hand, minute hand, and second hand, and the scale display control means sets a circular second hand scale display area for displaying a scale for the second hand, and displays the scale displayed in the second hand scale display area in the area inside the scale displayed in the hour hand scale area.

This arrangement enables indicating the hour, minute, and second of the time by means of the hour hand, minute hand, and second hand, and the user can therefore intuit the current time to the second from the hands. Furthermore, because the second hand scale is displayed inside of the hour hand scale, the second hand scale can be prevented from affecting displaying information in the no-scale area.

Furthermore, because the second hand scale is displayed in a 360-degree range around the outside circumference of the second hand scale display area, the display can be updated less frequently and power consumption can be reduced compared with an arrangement in which the second hand scale display changes.

Furthermore, if the second hand is shorter than the hour hand and the minute hand, the possibility of the second hand overlapping information displayed in the no-scale area is reduced and a drop in the readability of the displayed information can be prevented.

Further preferably, the needle indicator includes a second hand, the length of the second hand from the rotary pin of the second hand to the distal end of the second hand is greater than or equal to the length from the rotary pin of the minute hand to the distal end of the minute hand, and the scale display control means displays scales for the hour hand and the minute hand but does not display a scale for the second hand.

The second hand in a common timepiece is approximately the same length as the minute hand. The second hand is also usually thinner than the hour hand and minute hand. When such a second hand is used the range of second hand movement includes the scale display area of the hour hand and the minute hand, and if the second hand scale is displayed, the second hand scale could overlap the minute hand and the hour hand scale display areas and the information displayed in the no-scale area.

However, because this aspect of the invention does not display a scale for the second hand, the second hand scale does not overlap information displayed in the no-scale area, and a drop in the readability of the displayed information can be prevented.

The second hand may travel over the information displayed in the no-scale area with this aspect of the invention, but because the second hand moves quickly relative to the minute hand and moves away from the displayed information if it does pass over the displayed information, and there is no real drop in the readability of the information displayed in the no-scale area.

Yet further preferably, the display panel is a display device with image memory.

A display device with image memory is a display element that continues to display the same content for a certain period of time even when power is not supplied, such as an electrophoretic display (EPD) device, which is also known as electronic paper.

Using a display device with image memory for the display panel greatly reduces the power consumption required to maintain the display, extend the battery life and operating time in a portable timekeeping device such as a wristwatch, reduce the need for battery replacement or recharging, and thus improve convenience.

Furthermore, updating or refreshing the display of a display device with image memory consumes power, and power consumption can be reduced by increasing the refresh display interval. Power consumption can therefore be reduced accordingly by increasing the interval at which the scale and information displays are refreshed or updated.

Further preferably, the scale displayed in the scale area includes graduations denoting the position of the needle indicator, and a curved line connecting each of the graduations.

The readability of the graduations can be improved by connecting the individuals graduations with a curved connecting line.

Further preferably, the scale display control means displays a part of the scale using at least one of a color and line thickness that is different from other parts of the scale.

Further preferably, the part of the scale that is set according to the position indicated by the needle indicator is displayed using a different color or line thickness than the other parts of the scale. For example, if the minute hand scale is displayed for the range from 0 to 20 minutes and the minute hand points to 12, the color or line width of the graduations in the scale range from 10 to 15 minutes and the line connecting those graduations is different from the other parts of the displayed scale (that is, the parts for the ranges from 0 to 9 minutes and 16 to 20 minutes).

Note that a different color can be displayed by changing any one of the hue, brightness, and saturation characteristics to display a visually different color.

Displaying a part of the scale with a different color or thickness than other parts of the scale can be used to express the change in time. For example, if one hour (60 minutes) is divided into 15-minute segments and each scale segment is displayed using a different color or line width, which segment the current time is in can be easily determined, and this can be used to check on the progress of a meeting, such as how much time has passed or how much time remains, for example.

Furthermore, if the color or thickness of the scale is set based on schedule information, the scheduled event (content) can also be determined from the color or thickness of the scale.

Furthermore, if the color or thickness of the scale is changed according to the current position of the hand (needle indicator), the current time can be determined from the scale alone.

Further preferably, the scale display control means displays at least a part of the scale area using a different color than the color of the no-scale area.

If scale areas are set for the hour and the minute, a different color is preferably used for each scale area.

By using different colors for the scale areas and no-scale area, the scale areas can be readily determined and the current positions of the needle indicators, such as the time in the case of a timepiece, can be easily determined.

The colors of the scale areas can also be set so that the indicators stand out to improve the readability of the hands.

Furthermore, if different colors are used for the scale areas of the hour and minute, the positions of the hour hand and minute hand can be easily determined and the current time can be more easily determined.

Other objects and attainments together with a fuller understanding of the invention will become apparent and appreciated by referring to the following description and claims taken in conjunction with the accompanying drawings.

DESCRIPTION OF THE PREFERRED EMBODIMENTS

Preferred embodiments of the present invention are described below with reference to the accompanying figures.

Embodiment 1

Arrangement of a Combination Timepiece

Figure 1:
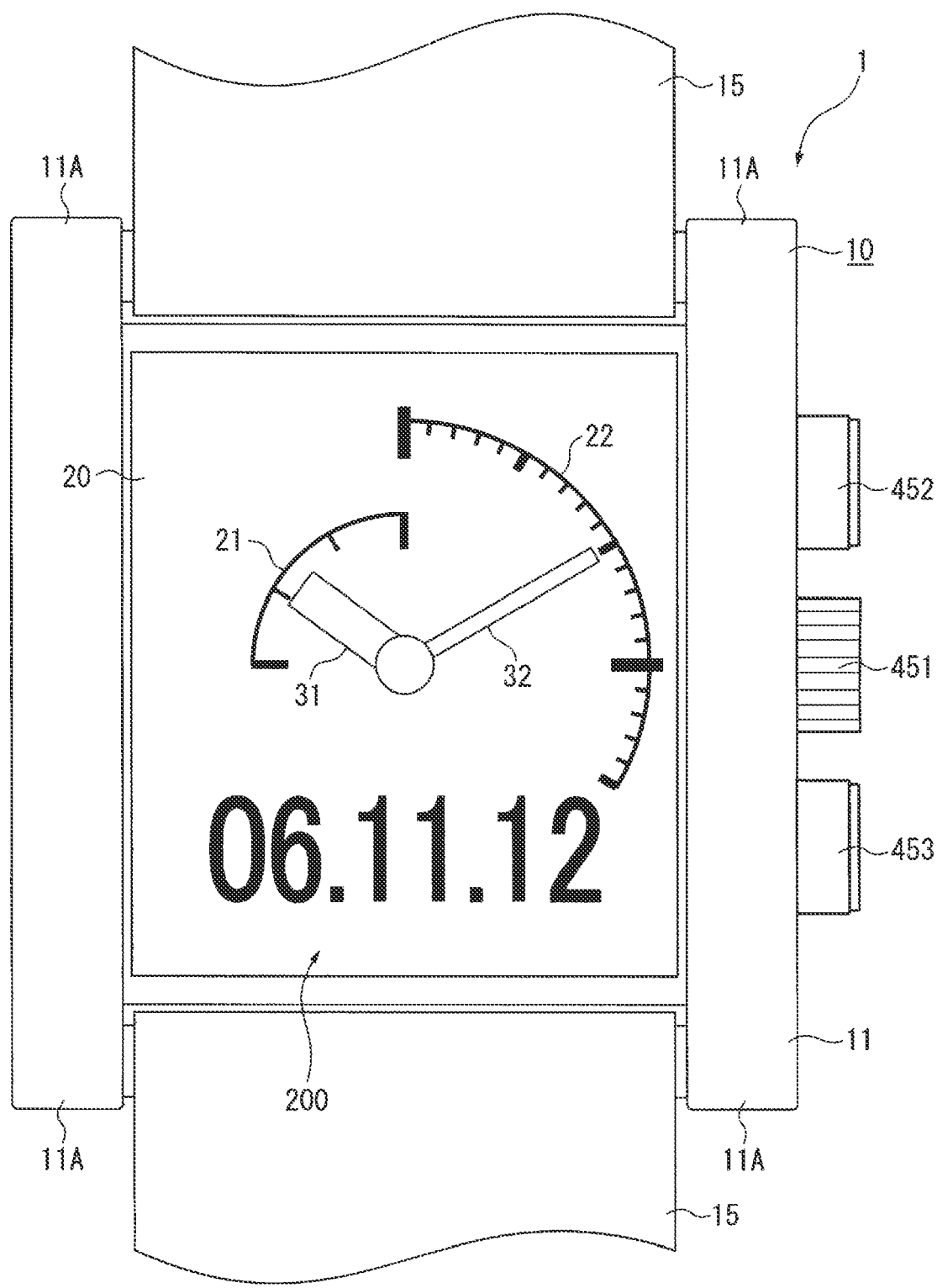
FIG. 1 is a front view of a combination timepiece according to a first embodiment of the invention.

FIG. 1 is a view from the front of a combination timepiece 1 rendering using the dial indicator display device according to the present invention.

This combination timepiece 1 has a timepiece body 10 and a 15, and is rendered as a wristwatch that is typically worn by the user on the wrist.

Figure 2:
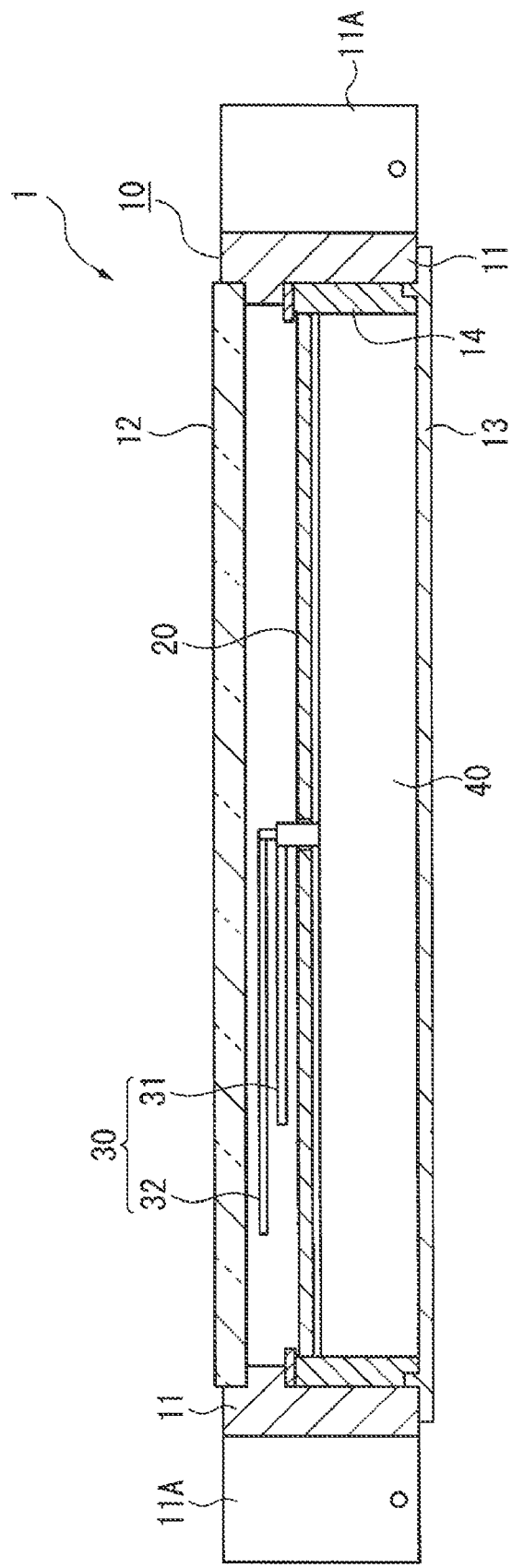
FIG. 2 is a section view of the combination timepiece according to this embodiment of the invention.

As shown in FIG. 2, the timepiece body 10 has a case member 11 (body) that is a rectangular tube in shape, a crystal 12 that covers the front side of the case member 11, and a back cover 13 that is removably affixed to the back of the case member 11.

The case member 11 is not limited to a rectangular cylinder shape (that is, rectangular in plan view), and the invention is not limited to the shapes shown in the figures and the case member 11 may be a round cylinder (circular or elliptical in plan view), for example.

A pair of lugs 11A for attaching a wristband is disposed at each of the opposite ends of the case member 11, and spring pins are removably installed between the lugs 11A. A band 15 is attached to the lugs 11A using the spring pins.

A display panel 20 (display device), hands 30, and a movement 40 are disposed inside the case member 11. In this embodiment of the invention the movement 40 is located inside of a spacer 14 inside the case member 11, and a common movement 40 can be used with case members 11 of different shapes and sizes by using a spacer 14 that is shaped and sized appropriately to the case member 11.

The display panel 20 is located behind the hands 30, and is rendered using electronic paper manufactured to the shape and size of the case member 11 using an electrophoretic display (EPD) device, for example. The display panel 20 is not so limited, however, and can use other types of display devices with memory, including an electrochromic display (ECD), a ferroelectric liquid crystal display, or a cholesteric liquid crystal display, or a common liquid crystal display or organic EL display can be used.

A separate dial is not disposed over the display panel 20 in this embodiment of the invention. More specifically, a dial normal means a component that is linked to the movement and has a scale or markings indicating time-related information, and this embodiment of the invention does not require a separate dial because a corresponding scale is displayed on the display panel 20. As a result, this embodiment of the invention does not need to provide a dial such as provided in a typical timepiece. In that the display panel 20 displays the scale, the display panel 20 also functions as the dial.

The hands 30 are located between the crystal 12 and the display panel 20 and are visible through the crystal 12. The hands 30 in this embodiment of the invention include an hour hand 31 and a 32, and a second hand is not provided. The spindle on which the hour hand 31 and the minute hand 32 rotate passes from the movement 40 through the display panel 20 into the space between the crystal 12 and the display panel 20.

Movement

The movement 40 controls driving the hands 30 (hour hand 31 and minute hand 32) and controls driving the display panel 20.

Figure 3:
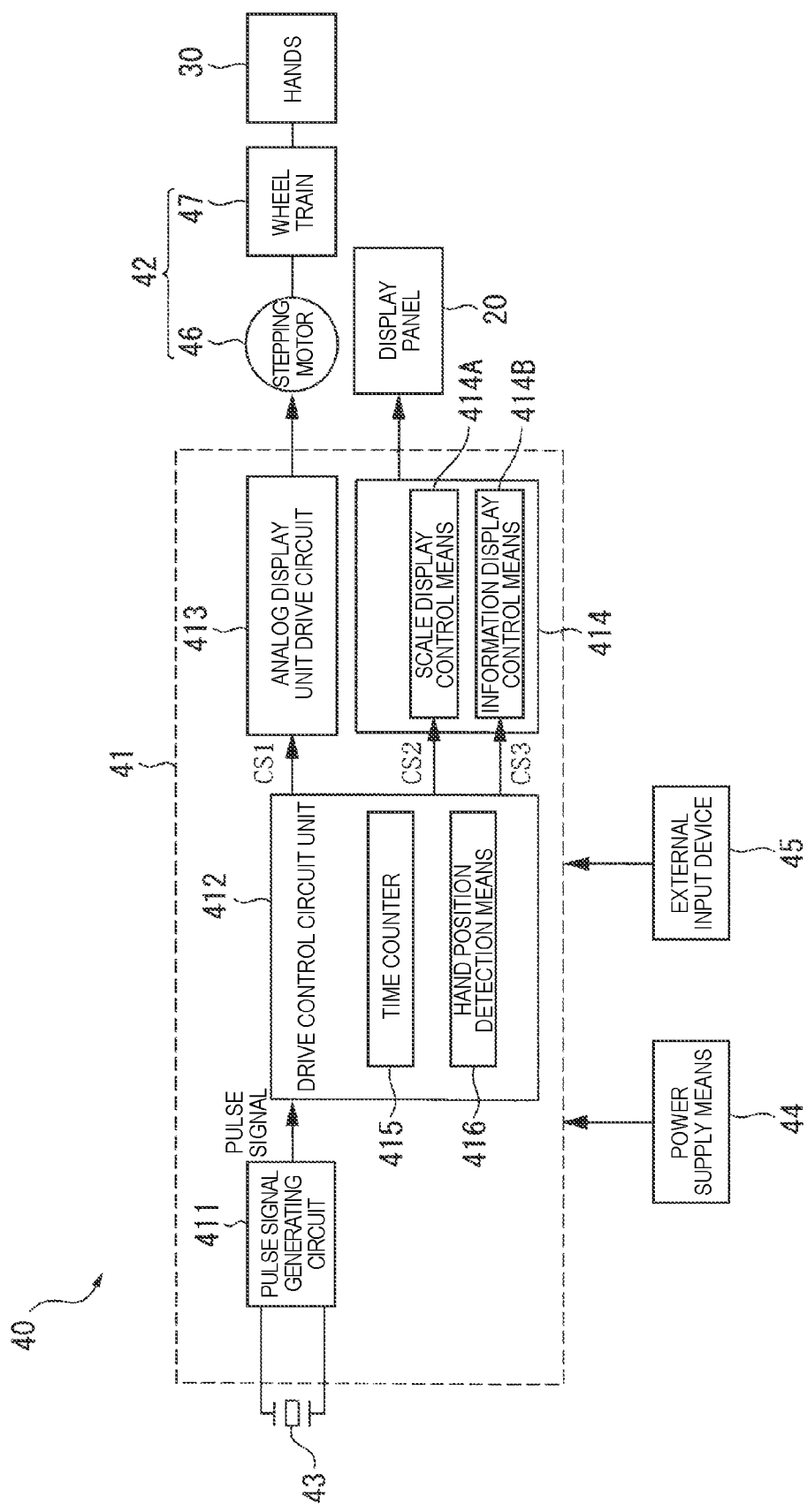
FIG. 3 is a block diagram showing the arrangement of the movement in this embodiment of the invention.

More specifically, as shown in FIG. 3, the movement 40 includes a control circuit 41 (drive control means) rendered using a semiconductor chip, a drive means 42 (hand movement means) that drives the hands 30, an oscillation circuit 43, a power supply means 44, and an external input device 45.

The drive means 42 includes a stepping motor 46 for driving the hands, and a wheel train 47 for transferring output from the stepping motor 46 to the hour hand 31 and minute hand 32. As in a conventional analog timepiece, this wheel train 47 is a speed-reducing wheel train that reduces the speed of while transferring the output of the stepping motor 46 to wheels attached to the hour hand 31 and minute hand 32. The drive means 42 thus renders a hand-moving means in this embodiment of the invention.

The oscillation circuit 43 is a crystal oscillator, for example, and outputs a pulse signal of a prescribed frequency.

The power supply means 44 is a primary battery or a secondary battery. If the power supply means 44 is a rechargeable secondary battery, a power generating means that uses a solar cell or rotary pendulum, for example, and can charge the secondary battery is also provided.

The external input device 45 is the crown or a button for setting or operating the timepiece, and recognizes the user operation and outputs a corresponding signal to the control circuit 41.

In this embodiment of the invention the external input device 45 includes the crown 451 and buttons 452 and 453 as shown in FIG. 1. The crown 451 and buttons 452 and 453 are located on the side of the timepiece body 10 as shown in FIG. 1. The location and number of the crown 451 and buttons 452 and 453 are not limited to what is shown in FIG. 1, and they can be arranged as needed according to the shape of the timepiece body 10, for example, to enable operation by the user.

Control Circuit Arrangement

The control circuit 41 includes a pulse signal generating circuit 411, a drive control circuit unit 412, an analog display unit drive circuit 413 that controls moving the hands, and a display panel drive circuit 414 that controls displaying content on the display panel 20.

The pulse signal generating circuit 411 frequency divides the pulse signal output from the oscillation circuit 43 and supplies a prescribed reference signal (typically a 1-Hz pulse signal) to the drive control circuit unit 412.

The drive control circuit unit 412 includes a time counter 415 and a hand position detection means 416.

The time counter 415 stores calendar information such as the date and time information such as the current time. These stored values can be adjusted using the external input device 45 and are sequentially updated based on the reference signal from the pulse signal generating circuit 411. More specifically, the time counter 415 has, for example, an hour counter, a minute counter, a second counter, a day counter, a month counter, and a year counter. When a 1-Hz reference signal is input from the pulse signal generating circuit 411, the drive control circuit unit 412 updates the second counter and the counts cascade such that when the second counter reaches 60, the minute counter increments one minute, the hour counter increments one hour when the minute counter reaches 60, and the current time is thus continuously updated and stored.

The drive control circuit unit 412 updates the day counter one day when the hour counter reaches 24, updates the month counter one month when the day counter is updated from the last day of the month, and thus updates and stores the current date.

The oscillation circuit 43, the pulse signal generating circuit 411, and the time counter 415 thus render a timekeeping means that keeps the time.

The hand position detection means 416 detects the positions of the hour hand 31 and the minute hand 32 based on information from the hour counter and minute counter in the time counter 415. More specifically, the hour hand 31 and the minute hand 32 are moved according to the values of corresponding counters in the 415, and the hand position detection means 416 can therefore indirectly detect the positions of the hour hand 31 and the minute hand 32 based on the corresponding counts kept by the time counter 415.

If the positions of the hour hand 31 and the minute hand 32 are detected based on the time counter 415, the counts stored by the time counter 415 are assumed to match the values indicated by the hour hand 31 and the minute hand 32. The time can therefore be adjusted after the user sets the hour hand 31 and minute hand 32 to indicate 0:00 and then resets the time counter 415 to 0:00 by performing a prescribed input operation. Alternatively, a sensor that detects when the hour hand 31 and minute hand 32 move to the 0:00 position can be provided, and the counts of the time counter 415 can be reset to 0:00 based on the output of this sensor to automatically set the time kept by the time counter 415.

Based on the time counter 415 information, the drive control circuit unit 412 outputs drive control signals CS1, CS2, and CS3 to the analog display unit drive circuit 413 and the display panel drive circuit 414.

The drive control signal CS1 output to the analog display unit drive circuit 413 is a pulse signal that is output at a one-minute interval that corresponds to updating the minute value of the time counter 415.

The drive control signal CS2 output to the display panel drive circuit 414 is information for displaying the scales 21 and 22 for the hour hand 31 and minute hand 32 on the display panel 20, and more specifically is information indicating the positions of the hour hand 31 and minute hand 32 detected by the hand position detection means 416.

The drive control signal CS3 output to the display panel drive circuit 414 is the time information displayed on the display panel 20, and in this embodiment of the invention is a signal denoting the numbers for the year, month, and date.

When the drive control signal CS1 is input from the drive control circuit unit 412, the analog display unit drive circuit 413 outputs a drive pulse to the stepping motor 46. More specifically, the analog display unit drive circuit 413 applies the output drive pulse to drive the stepping motor 46 and move the minute hand 32. Movement of the hour hand 31 is linked to stepping motor 46 drive.

The display panel drive circuit 414 includes a scale display control means 414A that controls displaying a scale (indices) on the display panel 20, and an information display control means 414B that controls displaying information on the display panel 20.

Scale Display Control

When the current positions of the hour hand 31 and minute hand 32 are detected from the drive control signal CS2 input from the drive control circuit unit 412, the scale display control means 414A sets the hour scale area 23 and the minute scale area 24 according to the hand positions, and displays the scales 21 and 22 for reading the values indicated by the hour hand 31 and minute hand 32 in the hour scale area 23 and minute scale area 24.

Figure 4:
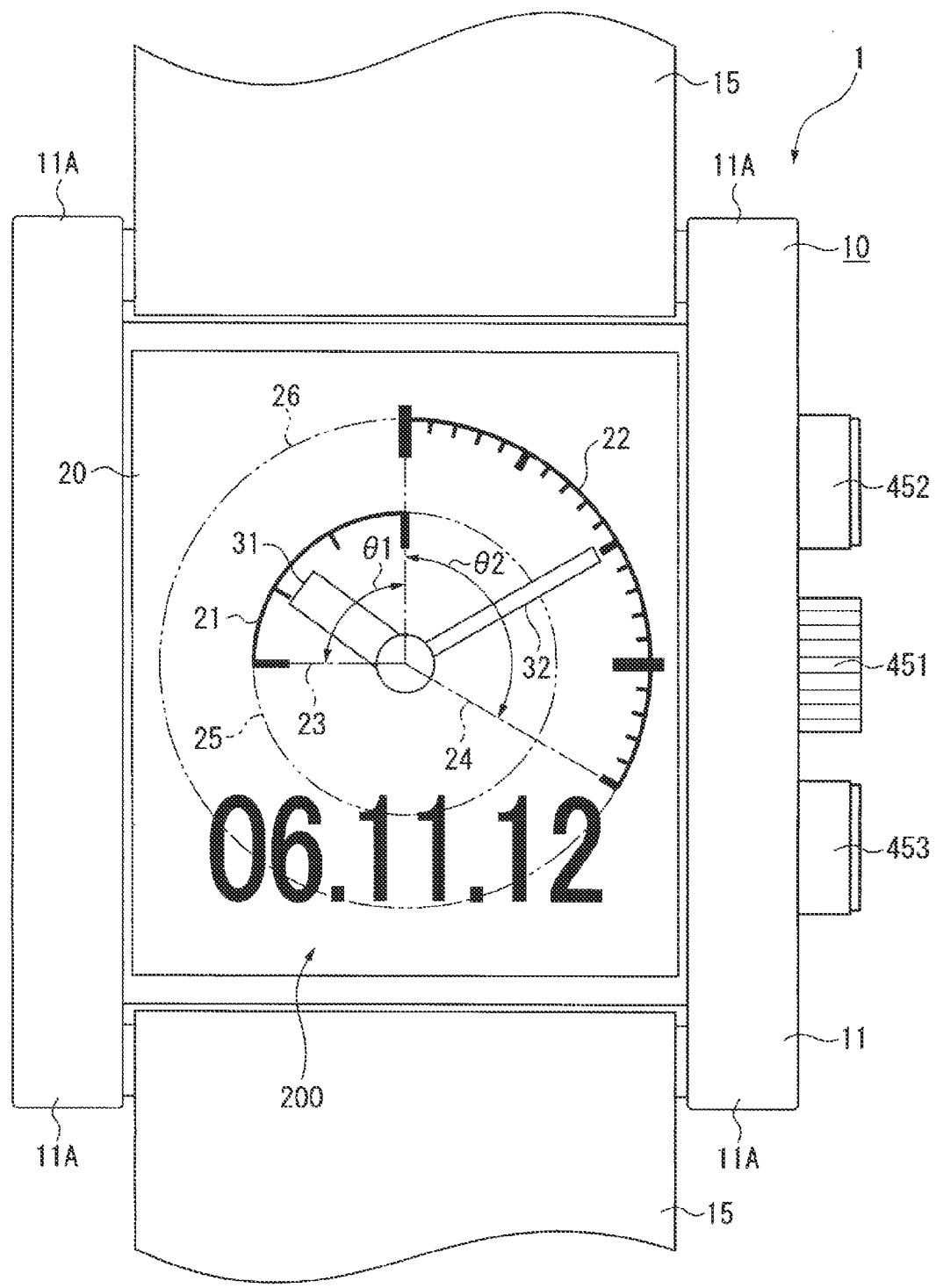
FIG. 4 shows the scale area in this embodiment of the invention.

More specifically, as shown in FIG. 4, the scale display control means 414A sets overlapping scale display ranges 25 and 26 on the display panel 20 within the range of hour hand 31 and minute hand 32 movement, and displays appropriate scales 21 and 22 in these display ranges 25 and 26.

The scales 21 and 22 include graduations disposed at equal intervals in a circumferential direction for indicating the positions of the hour hand 31 and minute hand 32, and a line arc connecting the graduations.

The graduations of the scale 21 for the hour hand 31 are disposed at a one-hour interval, that is, at a thirty-degree interval in the circumferential direction, and the graduations of the scale 22 for the minute hand 32 are disposed at a one-minute interval, that is, every six degrees in the circumferential direction.

In this embodiment of the invention the hour hand scale display range 25 is a circular area slightly larger than the area traced by the hour hand 31 when the hour hand 31 rotates 360 degrees (that is, the internal area of a circle of which the circumference is described by the distal end of the hour hand 31 and the center is the rotary axis of the hour hand 31).

The minute hand scale display range 26 is likewise a circular area slightly larger than the area of the circle described by the distal end of the minute hand 32 when the minute hand 32 rotates 360 degrees.

The scale display control means 414A sets the hour scale area 23 in the hour hand scale display range 25 according to the detected position of the hour hand 31, and sets the minute scale area 24 in the minute hand scale display range 26 according to the detected position of the minute hand 32.

The hour scale area 23 is a fan-shaped area defined by an arc of the circumference of the hour hand scale display range 25 and line segments connecting this arc with the rotating center pin of the hour hand 31 (radii of the circular hour hand scale display range 25). The center angle θ1 of the hour scale area 23 is greater than or equal to 30 degrees and less than or equal to 270 degrees, and is preferably approximately 90 degrees as shown in FIG. 4. The graduations indicating the hours 1 to 12 on a timepiece are disposed at 30-degree intervals (360°/12). In this embodiment of the invention the hour scale area 23 is therefore set with the center angle θ1 approximately 90 degrees so that the scale 21 shows four graduations.

The minute scale area 24 is a fan-shaped area defined by an arc of the circumference of the minute hand scale display range 26 and line segments connecting this arc with the rotating center pin of the minute hand 32 (radii of the circular minute hand scale display range 26). The center angle θ2 of the minute scale area 24 is also greater than or equal to 30 degrees and less than or equal to 270 degrees, and in this embodiment of the invention is approximately 120 degrees as shown in FIG. 4. The graduations indicating the minutes 1 to 60 on a timepiece are disposed at 6-degree intervals (360°/60). In this embodiment of the invention the minute scale area 24 is therefore set with the center angle θ2 approximately 120 degrees so that the scale 22 shows 21 graduations.

When the hour hand 31 and minute hand 32 move the scale display control means 414A sets the scale areas 23 and 24 according to the positions of the hour hand 31 and minute hand 32. More specifically, when the hour hand 31 or minute hand 32 reaches the border (end) of the scale area 23 or 24, the scale display control means 414A moves the scale areas 23 and 24 a prescribed distance in the direction that the hour hand 31 or minute hand 32 moves. This embodiment of the invention rotates the hour scale area 23 90° in the direction the hour hand moves, and rotates the minute scale area 24 120° in the direction the minute hand moves to set the new scale areas 23 and 24.

As shown in FIG. 4, for example, when the hour hand 31 reaches the scale 21 graduation at the 12:00 o'clock position, the scale display control means 414A sets the hour scale area 23 to the range from the scale 21 graduation at 12:00 to the scale 21 graduation at 3:00.

More specifically, because there are four graduations on the scale 21 for the hour hand 31 in the hour scale area 23, the hour scale area 23 is set by redrawing each of the graduations on the scale 21 referenced to the position of the next closest graduation rotating clockwise around the scale 21 when resetting the display to the next hour scale area 23. In other words, the hour scale area 23 is set to rotate 90° at a time in conjunction with movement of the hour hand 31. Display of the scale 21 is therefore updated in approximately three-hour intervals (the "update-display interval" below).

When the minute hand 32 moves to the 20-minute graduation on the scale 22, the scale display control means 414A sets the minute scale area 24 to the area from the 20-minute graduation to the 40-minute graduation on the scale 22.

The scale 22 for the minute hand 32 is thus set to move 120 degrees at a time in conjunction with movement of the minute hand 32. The update-display interval of this scale 22 is thus twenty minutes.

The display panel drive circuit 414 runs a display refresh operation to compensate for degradation of the display on the display panel 20 at a prescribed refresh display interval. This embodiment of the invention uses twenty minutes as the refresh display interval, and sets the update-display interval of the scale 22 to the same interval. The scale 22 also moves a prescribed amount that is set according to the refresh display interval, which in this embodiment is the 120° angle range equal to a 20-minute scale.

The scale display control means 414A sets the area of the scale display ranges 25 and 26 outside of the scale areas 23 and 24 as no-scale areas, and does not display the scales 21 and 22 in these no-scale areas. The part of the rectangular display area of the display panel 20 that is outside of the scale display ranges 25 and 26 is also a no-scale area. More specifically, all parts of the display area of the display panel 20 other than the area occupied by the scale areas 23 and 24 are part of the no-scale area.

The scale display control means 414A controls driving the display panel 20 according to the drive control signal CS3 input from the drive control circuit unit 412 to display specific information 200. In FIG. 1 and FIG. 4 the date information including the year, month, and day of the current date is displayed. The display panel drive circuit 414 updates the date display on the display panel 20 once a day. The displayed information can be adjusted using the crown 451 or buttons 452 and 453, for example. The buttons, for example, can be operated to change the information displayed on the display panel 20 to various other types of time information, including the day of the week, the current time (hour, minute, second), or world time information including the name of a city in a different time zone and the current time in that city. Other information, such as a schedule, a to-do list, or an address book, can also be displayed if the combination timepiece 1 includes the functions of a PDA (personal digital assistant), for example.

When displaying information the information display control means 414B of the display panel drive circuit 414 prevents the displayed information 200 from overlapping the hour hand 31 and minute hand 32 by displaying the information in the area outside the scale areas 23 and 24.

As shown in FIG. 1 and FIG. 4, for example, when the scale areas 23 and 24 are in the top half of the display panel 20, the information display control means 414B displays the information 200 in the bottom half of the display panel 20.

Figure 5:
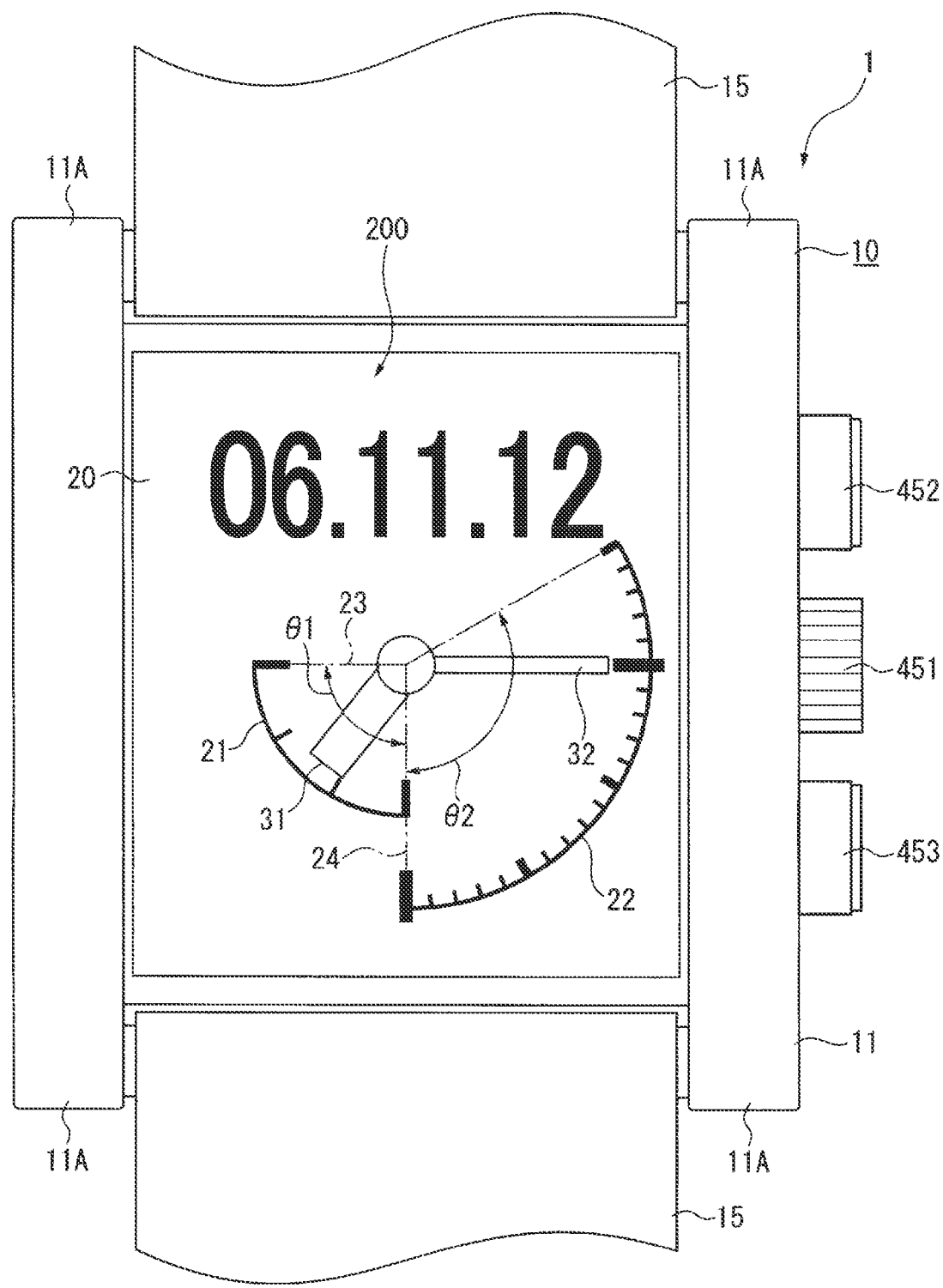
FIG. 5 shows information displayed in a different area in this embodiment of the invention.

When the scale areas 23 and 24 are displayed in the bottom half of the scale areas 23 and 24 as shown in FIG. 5, however, the information display control means 414B displays the information 200 in the top half of the display panel 20.

The information display control means 414B thus appropriately adjusts the size and where the information 200 is displayed on the display panel 20 according to the locations of the scale areas 23 and 24.

This aspect of the invention affords the following benefits.

(1) Because the 414a sets the scale areas 23 and 24 for the hour hand 31 and minute hand 32 and displays the scales 21 and 22 in the scale areas 23 and 24, the scales 21 and 22 can be displayed according to the current positions of the hour hand 31 and minute hand 32. The scales 21 and 22 can therefore be displayed near the distal ends of the hour hand 31 and minute hand 32, and the readability of the values indicated by the hands 31 and 32 can be improved. More particularly, because the combination timepiece 1 according to this embodiment of the invention displays a scale 22 near the distal end of the hour hand 31, the readability of the hands 31 and 32 can be improved compared with a conventional timepiece in which the scale is displayed farther away from the tip of the hand.

(2) A large area for displaying information 200 by means of the information display control means 414B can be assured because the scale display control means 414A displays the scales 21 and 22 only in the scale areas 23 and 24. More specifically, if the scales 21 and 22 are displayed around the entire scale display ranges 25 and 26, there is substantially no space left on the display panel 20 for displaying the information 200. This embodiment of the invention therefore displays the scales 21 and 22 only in the scale areas 23 and 24, and can therefore display the other information 200 in the no-scale area of the scale display ranges 25 and 26 as shown in FIG. 4. The information 200 can therefore be displayed using a large area, the information 200 can be displayed large, and the readability of the information can be improved.

Furthermore, displaying the information 200 in the no-scale area reliably prevents the hour hand 31 and minute hand 32 from overlapping the displayed information. This also helps improve the readability of the information.

The display area of the display panel 20 can be used effectively and different kinds of information can be presented to the user as a result of the scale display control means 414A displaying the information 200 on the display panel 20.

(3) The display panel 20 is rendered using an EPD or other type of display panel with image memory, and thereby reduces power consumption and can increase battery life. More particularly, this embodiment of the invention updates the scale 22 for the minute hand 32 approximately every twenty minutes, and updates displaying the scale 21 for the hour hand 31 approximately every three hours.

Because the shortest update interval at which displaying the scales needs to be controlled is every twenty minutes, the information display control means 414B can reduce how frequently the display is updated and can reduce power consumption accordingly compared with when the information display is updated every minute in conjunction with movement of the minute hand 32.

Furthermore, because the update interval of the scale 22 is set to the same interval as the refresh display interval of the display panel 20, the number of times power is supplied can be reduced and power conservation can be improved compared with refreshing the scale 22 at a different time.

(4) By using the display panel 20 to render the dial, the thickness of the timepiece 1 can also be reduced compared with an arrangement having a dial stacked on the display panel 20. The layout of the dial can also be designed as desired by controlling the display on the display panel 20, and the design of the combination timepiece 1 can thus be further improved.

Embodiment 2

A second embodiment of the invention is described next. Note that in the embodiments described below identical or similar elements are identified by the same reference numerals, and further description thereof is omitted or simplified.

Figure 6:
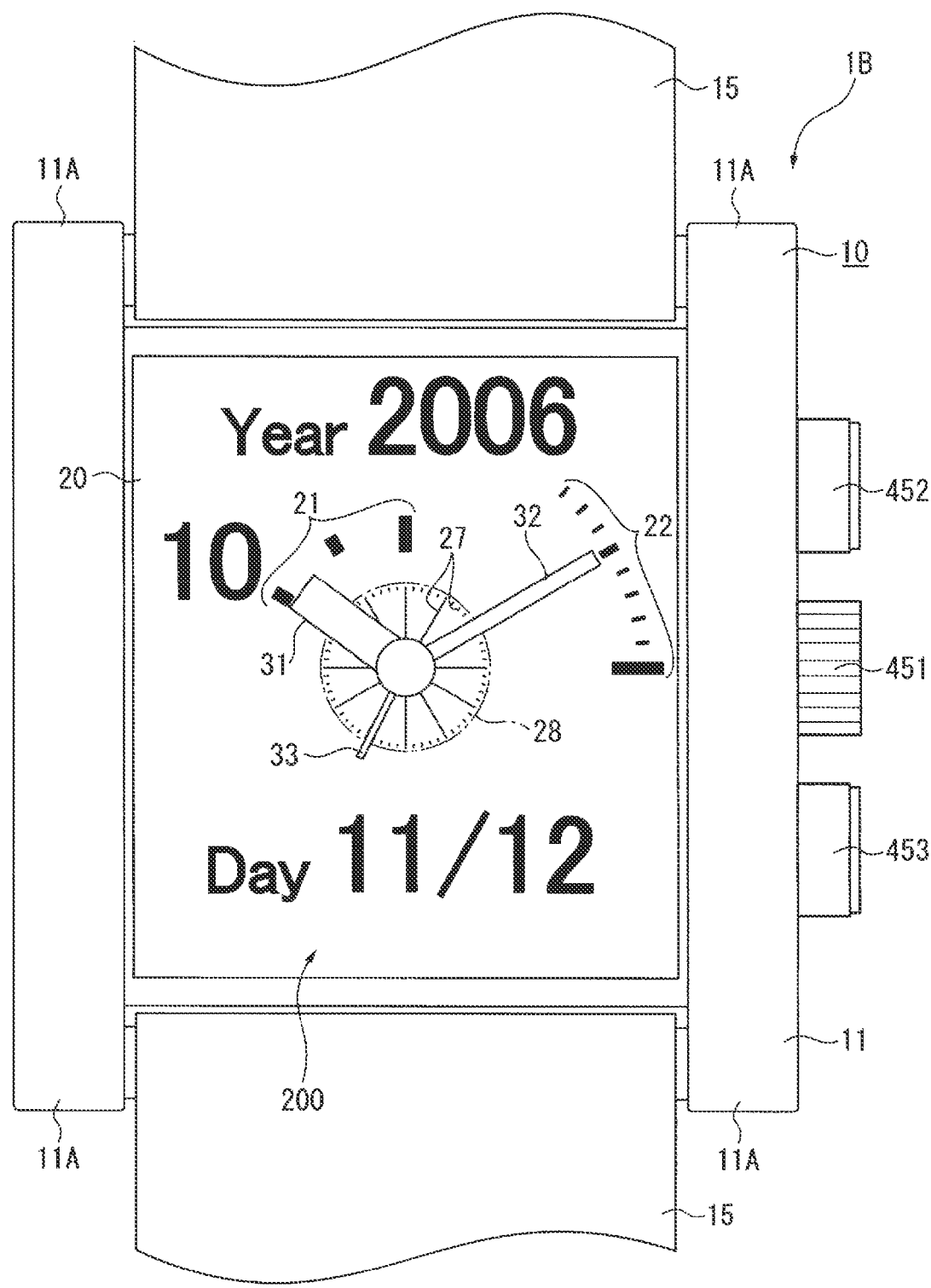
FIG. 6 is a front view of a combination timepiece according to a second embodiment of the invention.
Figure 7:
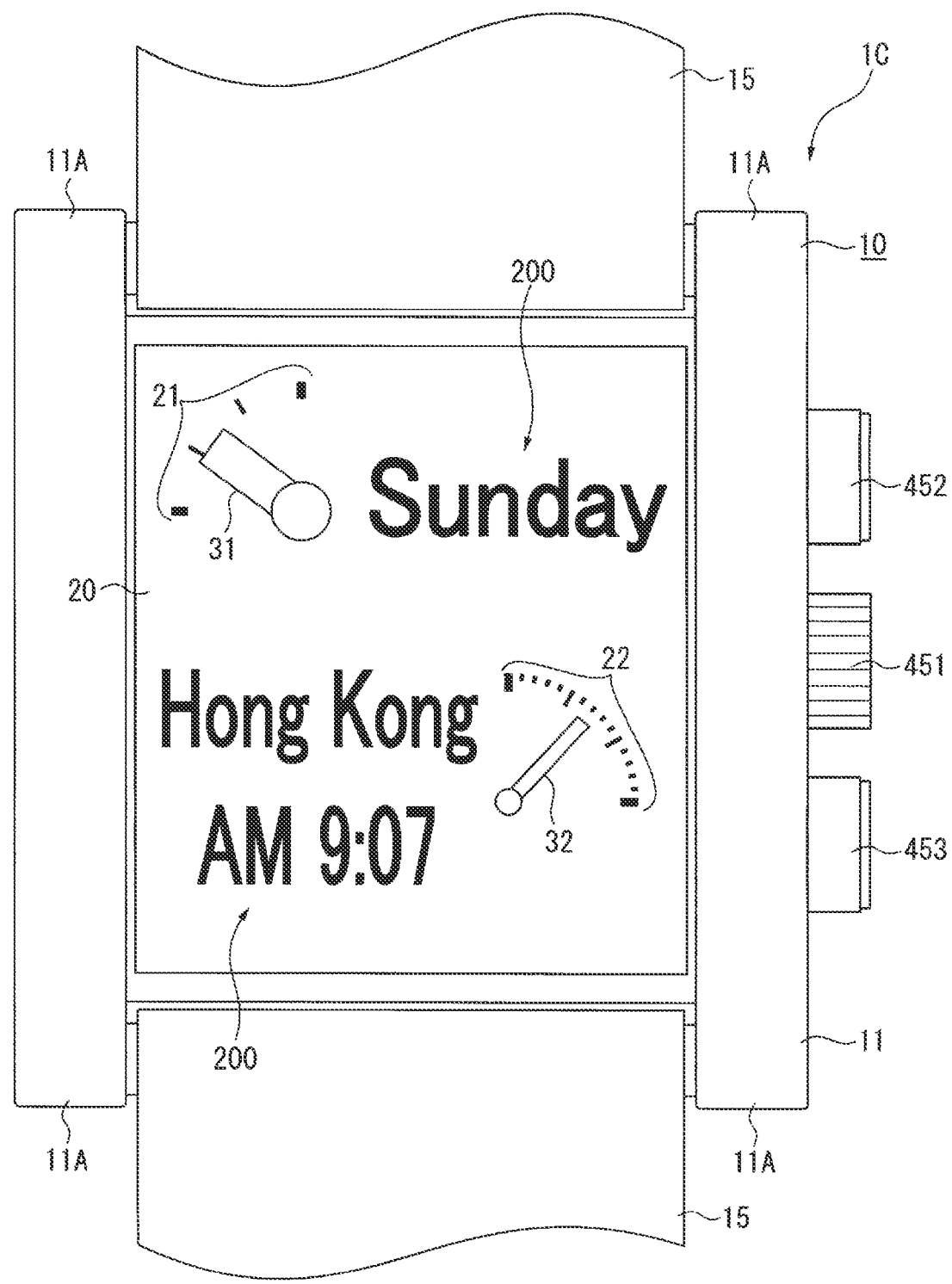
FIG. 7 is a front view of a combination timepiece according to a third embodiment of the invention.

As shown in FIG. 6, a combination timepiece 1B according to a second embodiment of the invention differs from the combination timepiece 1 of the first embodiment in that a second hand 33 is added and a scale 27 for the second hand 33 is displayed on the display panel 20, but other aspects of this embodiment are substantially the same as described above. This combination timepiece 1B is thus a timepiece that indicates the hour, minute, and second using corresponding hands.

As in a conventional timepiece, the second hand 33 is attached to and driven by a specific wheel in the wheel train 47.

However, while the second hand is normally longer than the hour hand and minute hand in a conventional timepiece, the second hand 33 in this embodiment of the invention is set to a length shorter than the hour hand 31 as shown in FIG. 6.

The scale 27 is displayed inside the scale 21 for the hour hand 31, and the graduations on this scale 27 are displayed at a 6° interval on a circle concentric to the rotary axis of the hands. More specifically, the scale display control means 414A sets a circular second hand scale display range 28 for displaying the scale 27 of the second hand 33, and displays the graduations of the scale 27 around the entire circumference (360 degrees) of the second hand scale display range 28. Every fifth graduation on the scale 27 is formed by a straight line connecting the graduations scale 27 that are point symmetrical to the axis of rotation of the hands for improved readability. For example, the graduations at the 0 and 30 second positions are joined by a straight line.

The center angle θ1 of the hour scale area 23 is approximately 60 degrees and three graduations are displayed on the scale 21. The center angle θ2 of the minute scale area 24 is approximately 48 degrees, and nine graduations are displayed on the scale 22. Note that the scales 21 and 22 can be rendered as described in the first embodiment.

The number representing the hour is also displayed beside the scale 21 for indicating the current hour in this embodiment of the invention. As shown in FIG. 6, the number "10" is displayed beside the scale 21 that is also indicating 10:00.

The information 200 displayed in the no-scale area also shows "Year 2006" indicating the year and "Day 11/12" indicating the current date.

This embodiment of the invention affords the same benefits as the first embodiment described above.

In addition, this embodiment of the invention also has a second hand 33 and can therefore indicate the time in hours, minutes, and seconds using the hour hand 31, minute hand 32, and second hand 33.

Furthermore, because the second hand 33 is shorter in length than the hour hand 31, the second hand 33 is prevented from overlapping information displayed on the display panel 20, and the readability of the information 200 can be improved while also providing a second hand 33. More specifically, when the second hand 33 is longer than the minute hand 32 as in a common timepiece, it is extremely difficult to display other information 200 so that it is not overlapped by the second hand 33 because the second hand 33 travels one revolution per minute. As a result, the second hand 33 always passes over the displayed information. By using a short second hand 33, however, the second hand 33 will not overlap other displayed information and this embodiment of the invention can improve the readability of other information while also using a second hand 33 to indicate the second.

Embodiment 3

A third embodiment of the invention is described next.

The combination timepiece 1C according to this third embodiment of the invention disposes the rotating axes of the hour hand 31 and minute hand 32 at different positions separated on the plane of the display panel 20 instead of coaxially as in the embodiments described above.

More specifically, the hour hand 31 is located in the top left part and the minute hand 32 is located in the bottom right part of the display panel 20.

The scale display control means 414A therefore sets the center angle θ1 of the hour scale area 23 to 90 degrees and displays a scale 21 with four graduations, and sets the center angle θ2 of the minute scale area 24 to 90 degrees and displays a scale 22 with 16 graduations.

The information display control means 414B displays the information 200 in areas at the top right and bottom left parts of the display panel 20. This embodiment of the invention displays the weekday and world time information including the name of another city and the time at that location.

The displayed information is not so limited, however, and as described above can include the year, month, and day or other information.

Note that there is substantially no display area above and to the left of the hour hand 31 and below and to the right of the minute hand 32. As a result, if the hour hand 31 is in the right half of the hour hand scale display range 25, that is, the hour hand 31 points to a graduation from 0:00 to 6:00, the information display control means 414B sets the information display area so that it does not overlap the scale 21 displayed in the hour scale area 23. For example, the information display control means 414B reduces the information display area by reducing the text size of the displayed information.

Likewise when the minute hand 32 points to a graduation in the left half of the minute hand scale display range 26, that is, the minute hand 32 points to a graduation between the 30-minute graduation and the 60-minute graduation, the information display control means 414B sets the information display area so that it does not overlap the scale 22 displayed in the minute scale area 24.

This embodiment of the invention affords the same benefits as the first embodiment described above.

In addition, the information display control means 414B displays information 200 in two areas, at the top right and bottom left, of the display panel 20. However, because the information displayed in these areas can be controlled separately according to the movement of the separately located hour hand 31 and minute hand 32, the display can be easily controlled by determining only whether the hour hand 31 and minute hand 32 are located in the left or right half of the respective scale display ranges 25 and 26.

Embodiment 4

A fourth embodiment of the invention is described next.

Figure 8:
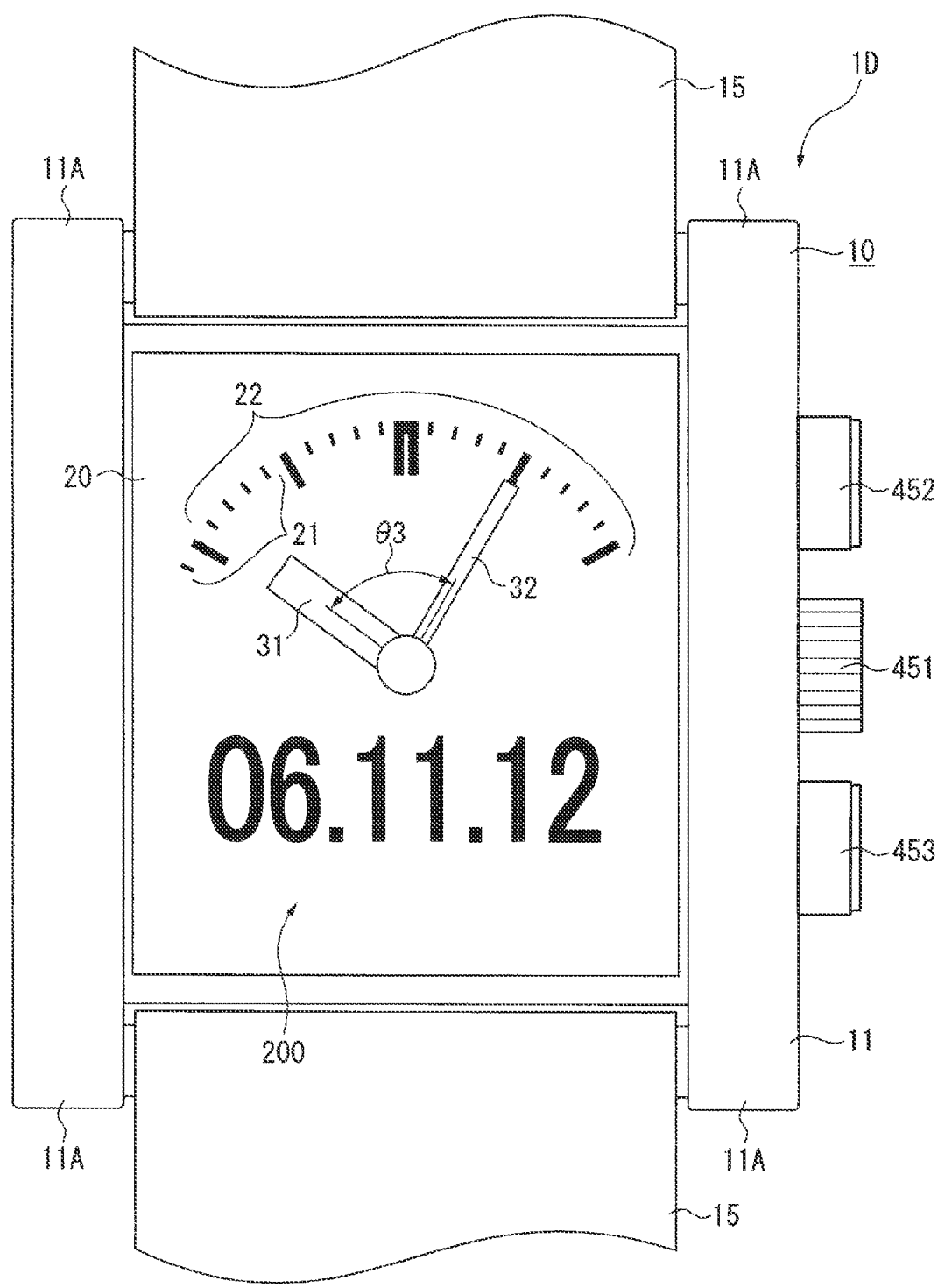
FIG. 8 is a front view of a combination timepiece according to a fourth embodiment of the invention.

As shown in FIG. 8, the combination timepiece 1D according to this fourth embodiment of the invention displays the scales 21 and 22 for the hour hand 31 and minute hand 32 contiguously.

More specifically, in this embodiment of the invention the scale display control means 414A sets the hour scale area 23 and the minute scale area 24 contiguously to each other if the angle (angle of intersection) θ3 formed by the hour hand 31 and the minute hand 32 and detected by the drive control circuit unit 412 (hand position detection means) is less than or equal to a prescribed angle (such as 90 degrees), and displays the scales 21 and 22 of the scale areas 23 and 24 at equidistant positions from the rotational axis of the hands.

If the angle formed by the hour hand 31 and minute hand 32 is greater than this prescribed angle, the scale 21 displayed in the hour scale area 23 is displayed inside the scale 22 displayed in the minute scale area 24.

This embodiment of the invention affords the same benefits as the first embodiment described above.

In addition, displaying the scales 21 and 22 contiguously enables updating the scales 21 and 22 less frequently than when the scales 21 and 22 are displayed separately as in the first embodiment, and can therefore further reduce power consumption. Referring to FIG. 8, for example, if the time is approximately 9:50, the angle of intersection θ3 of the hour hand 31 and minute hand 32 is substantially 0°. In this case, if the center angle θ1 of the hour scale area 23 for the hour hand 31 is set to approximately 30 degrees and the radius is set to the same length as the radius of the minute scale area 24, and the center angle θ2 of the minute scale area 24 for the minute hand 32 is set to approximately 120 degrees, the scales 21 and 22 will be displayed contiguously over a range of approximately 120 degrees as shown in FIG. 8.

This enables reading the time indicated by the hour hand 31 and minute hand 32 from the continuously displayed scales 21 and 22 until the minute hand 32 advances approximately 20 minutes, that is, moves a 120 degree angle of rotation. It is therefore not necessary to update the display of the 2122 for 20 minutes, displaying the scales can be updated less frequently, and power consumption can be further reduced.

Furthermore, because the scales 21 and 22 are displayed contiguously, the scales can be displayed more closely resembling the dial presented on a typical timepiece than when the scales 21 and 22 are displayed at different radial positions in the scale display ranges 25 and 26 as in the first embodiment, and a design that is more familiar to the user and easily read can be achieved.

Embodiment 5

A fifth embodiment of the invention is described next.

Figure 9:
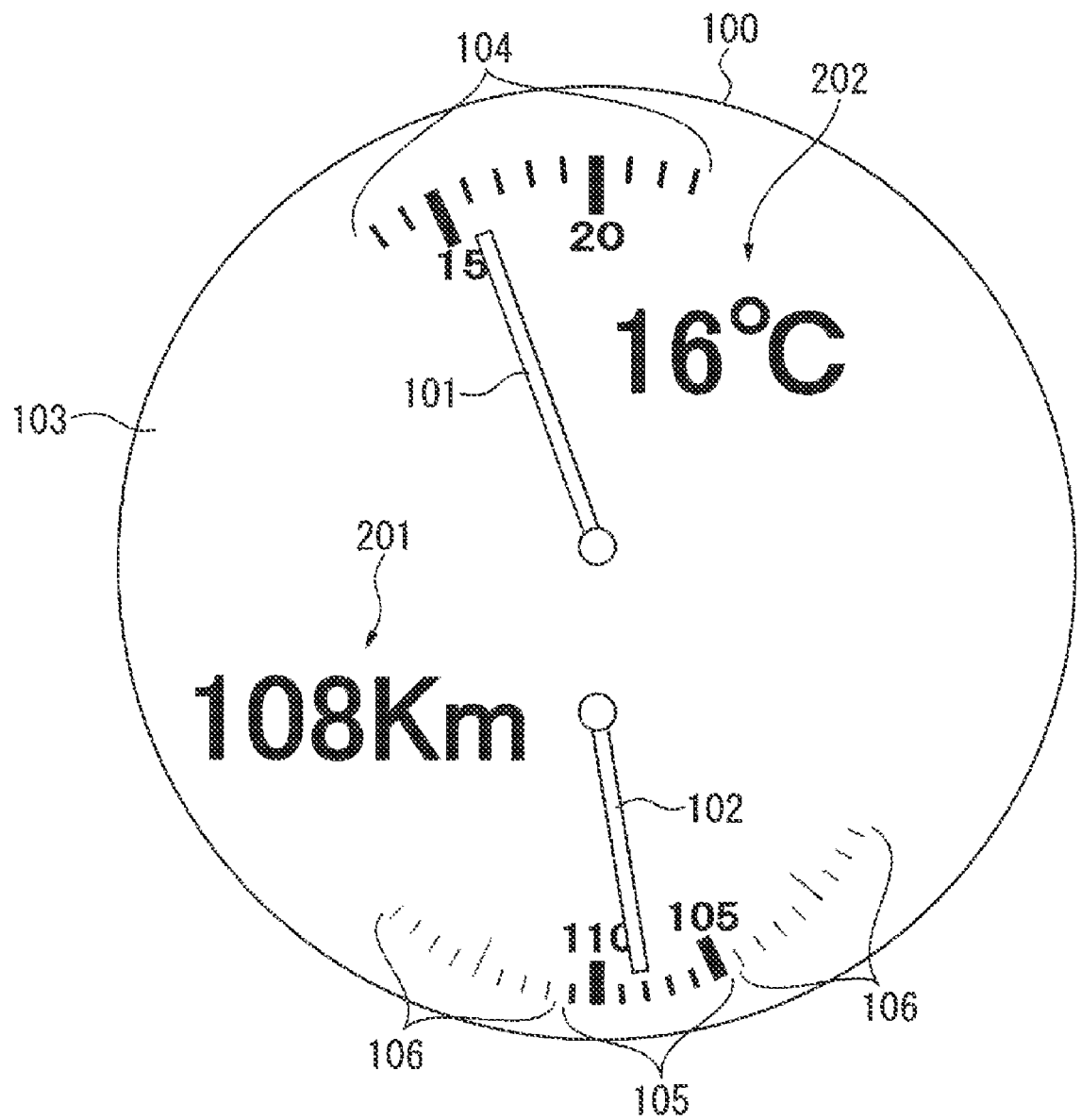
FIG. 9 is a front view showing the motor in a fifth embodiment of the invention.

This fifth embodiment of the invention applies the dial indicator display device of the invention to an instrumentation meter 100 as shown in FIG. 9, and more specifically to a meter 100 that is used in the instrumentation panel of an automobile and contains a speedometer and a thermometer.

This meter 100 includes a thermometer needle 101 for indicating the temperature and a speedometer needle 102 for indicating the speed, and a display panel 103 covering the entire surface of the meter 100.

Scale display ranges (not shown in the figure) are set on the display panel 103 according to the positions of the needles 101 and 102, and scales 104, 105, and 106 are displayed in these scale ranges. In this example scales 104 and 105 are displayed black and scale 106 is displayed gray. Complementing the indications of the needles 101 and 102, speed information 201 and temperature information 202 are also digitally displayed on the display panel 103.

As in the foregoing embodiments, this embodiment of the invention also displays the scales 104 and 105 according to the positions of the needles 101 and 102, and thus makes it easier to read the values indicated by the needles 101 and 102.

Furthermore, because the scales 104 and 105 are only displayed in the set scale display ranges, other parts of the display panel 103 can be used to display other information, such as the digital readings of the analog meters. Furthermore, because the display areas for this other information are set outside the scale display ranges for the needles, the needles 101 and 102 will not overlap the displayed information and the readability of the displayed information can therefore also be improved.

Furthermore, by displaying some of the graduations 105 black and other graduations 106 gray, the black graduations 105 can be displayed to follow the movement of the needle 102 even if the needle 102 moves greatly when the display panel 103 is an electrofluorescent display. More specifically, when the display panel 103 is an electrofluorescent display, a certain amount of time (delay) is required to change the display from white to black. This means that redrawing the scale 105 according to the position of the needle 102 may be delayed if the needle 102 suddenly swings out of the range of the scale 105. However, because the display can be redrawn from gray to black more quickly than from white to black, gray graduations 106 can be changed to black graduations 105 as the needle 102 moves and the scale 105 can be quickly displayed if a scale 106 having gray graduations is displayed on both sides of the scale 105 with black graduations.

Embodiment 6

A sixth embodiment of the invention is described next.

The timepiece 1E according to this sixth embodiment of the invention differs from the foregoing embodiments in that information is also displayed outside of the scale display range, that is, in the no-scale area set outside an extension of the hour hand 31 and minute hand 32.

Figure 10:
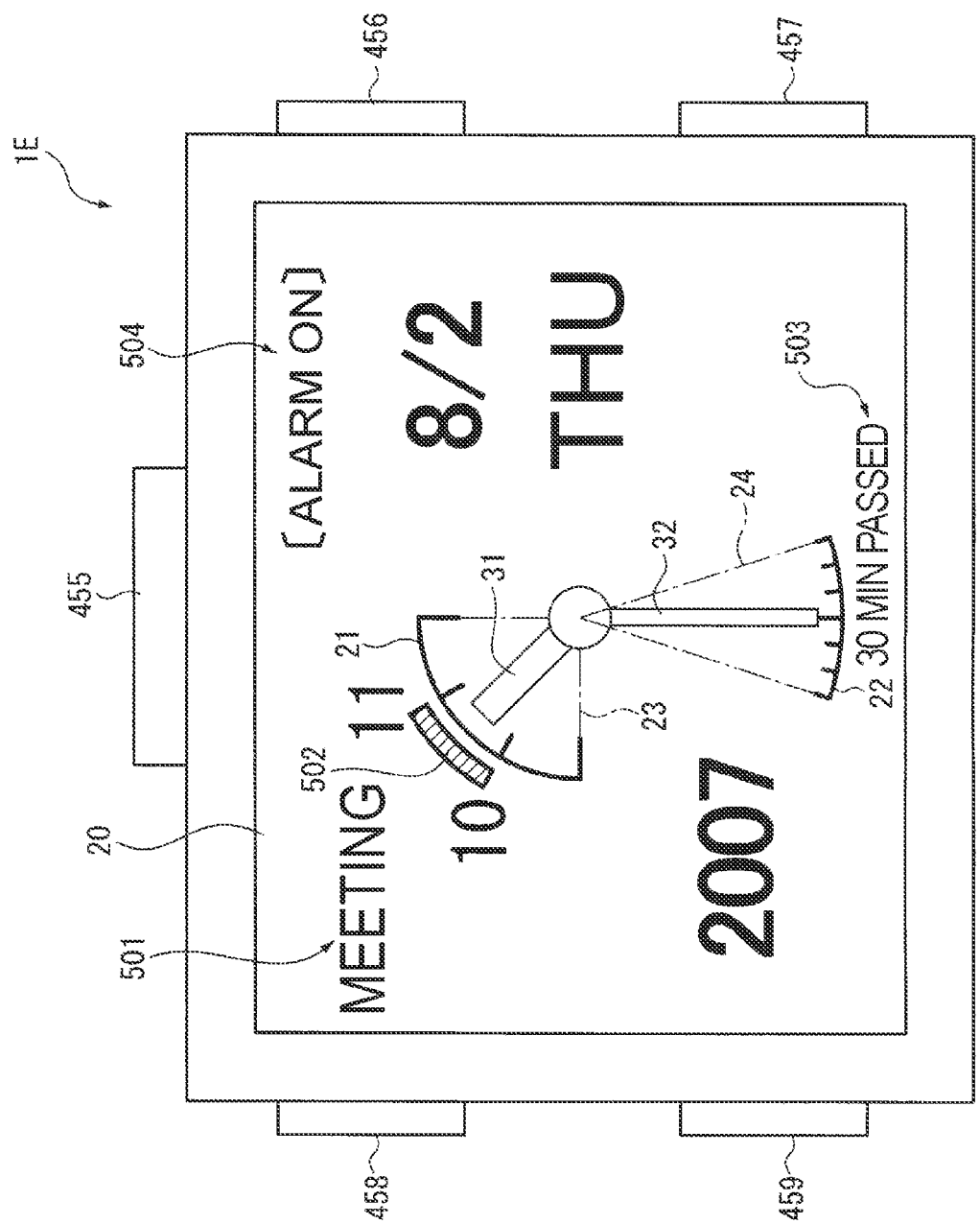
FIG. 10 is a front view of a combination timepiece according to a sixth embodiment of the invention.

Note that while FIG. 10 shows a table clock, the timepiece could be a wristwatch or a wall clock.

This timepiece 1E has a display panel 20 with a rectangular display area, and a plurality of operating buttons 455 to 459 as external input devices 45.

Figure 11:
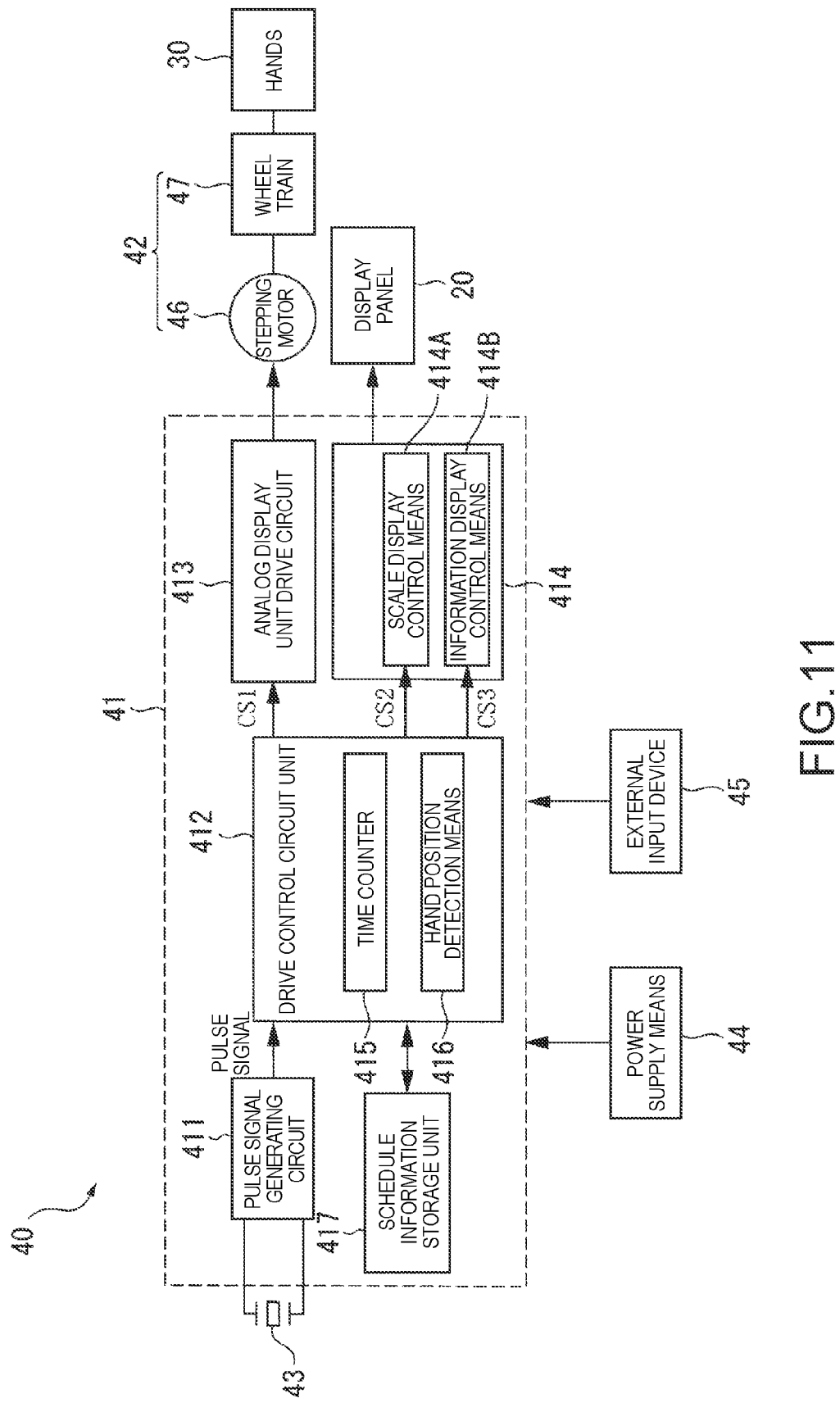
FIG. 11 is a block diagram showing the arrangement of the movement in the sixth embodiment of the invention.

In addition to the parts described in the first embodiment, the control circuit 41 of this timepiece 1E also includes a schedule information storage unit 417 for storing schedule information as shown in FIG. 11, and enables inputting schedule information using the buttons 455 to 459. The schedule information includes scheduled content information describing the scheduled event, and scheduled time information indicating the time of the scheduled event.

The scale display control means 414A sets a hour scale area 23 and a minute scale area 24 on the display panel 20, and displays arc-shaped scales 21 and 22 in the scale areas 23 and 24.

The parts of the display area of the display panel 20 outside the scale areas 23 and 24 are set as the no-scale area. This no-scale area therefore also includes parts of the display panel 20 on the outside of the scale areas 23 and 24 as shown in FIG. 10.

The information display control means 414B displays other information in the no-scale area. More specifically, information related to the time, including calendar information denoting the year, month, day, and weekday, and scale information that indicates the hour and is displayed outside the scale 21 (the numbers "10" and "11" representing 10:00 and 11:00 in FIG. 10), is displayed in the no-scale area by the information display control means 414B.

This embodiment of the invention displays schedule information as the time-related information. The schedule information includes scheduled content information describing the scheduled event and scheduled time information indicating the time of the scheduled event. As shown in FIG. 10, the scheduled event information 501 is text indicating the scheduled event, such as "MEETING." The scheduled time information 502 is pictorial information that is displayed along the outside circumference of the scale 21 as a band that extends from the graduation indicating the scheduled starting time (the 10:00 graduation in this example) to the graduation indicating the scheduled ending time (the 11:00 graduation in this example). The scheduled time information can also be displayed using numbers indicating the scheduled starting and ending times.

Schedule-related information 503 is displayed as the time-related schedule information outside of the scale 22 for the minute hand 32, that is, in the area extended from the minute hand 32. The schedule-related information 503 is text information that in this example indicates that the current time is 30 minutes passed the scheduled 10:00 starting time of the meeting. The schedule-related information 503 can also be displayed using a graphic instead of text.

In this embodiment of the invention the user appropriately operates the buttons 455 to 459 to enter the schedule registration mode. This causes the information display control means 414B to display a schedule registration screen in the no-scale area of the display panel 20.

The user then operates the buttons 455 to 459 to input and store the scheduled event and time information (starting time and ending time) in the schedule information storage unit 417, and then exit the schedule registration mode.

The timepiece 1E can also be provided with a wired or wireless data communication function so that schedule information entered in an external personal computer or cell phone, for example, can be transferred to the timepiece 1E and stored in the schedule information storage unit 417.

When the hour hand 31 and minute hand 32 of the timepiece 1E are moved by the movement, the display of the hour scale 21 moves in conjunction with movement of the hour hand 31 and the display of the minute scale 22 moves in conjunction with movement of the minute hand 32.

If schedule information is stored in the schedule information storage unit 417 and the time range covered by the scale 21 includes the time saved in the scheduled time information 502, the information display control means 414B displays a band representing the scheduled time information 502 along the outside circumference of the scale 21 and displays the scheduled event information 501.

The schedule-related information 503 is also displayed outside the scale 22.

If the current time is within the scheduled event time, the information display control means 414B can also display "ALARM ON" as auxiliary information 504 on the display panel 20, for example.

This embodiment of the invention affords the same benefits as the first embodiment described above.

More specifically, the timepiece 1E also displays information in the no-scale areas on the outside circumference side of the scales 21 and 22, including in the area on an extension of the hands 31 and 32. Time-related schedule information can therefore be displayed on the outside of the scale 21 indicating the scheduled time, and the user can thus be easily and reliably reminded of schedule information related to the current time.

Furthermore, because the scheduled time information 502 is displayed as a band, the user can also easily visually grasp the scheduled time.

The user can also be more accurately informed of the current status because the information display control means 414B also displays the schedule-related information 503 on the display panel 20. The user can also be more accurately informed of the current status because the information display control means 414B also displays auxiliary information 504 on the display panel 20.

Furthermore, space that is not part of the scale display ranges 25 and 26, that is, the scale areas, set in circles around the rotational axes of the hour hand 31 and minute hand 32 occurs in the four corners of the rectangular display panel 20.

Furthermore, by displaying information in the no-scale areas disposed outside the scale display ranges 25 and 26, this embodiment of the invention can also effectively use the display area of the display panel 20 to efficiently display additional information.

Embodiment 7

A seventh embodiment of the invention is described next. This embodiment differs from the first embodiment by displaying a part of the scales 21 and 22 differently from the other part of the scale, but is otherwise identical.

Figure 12:
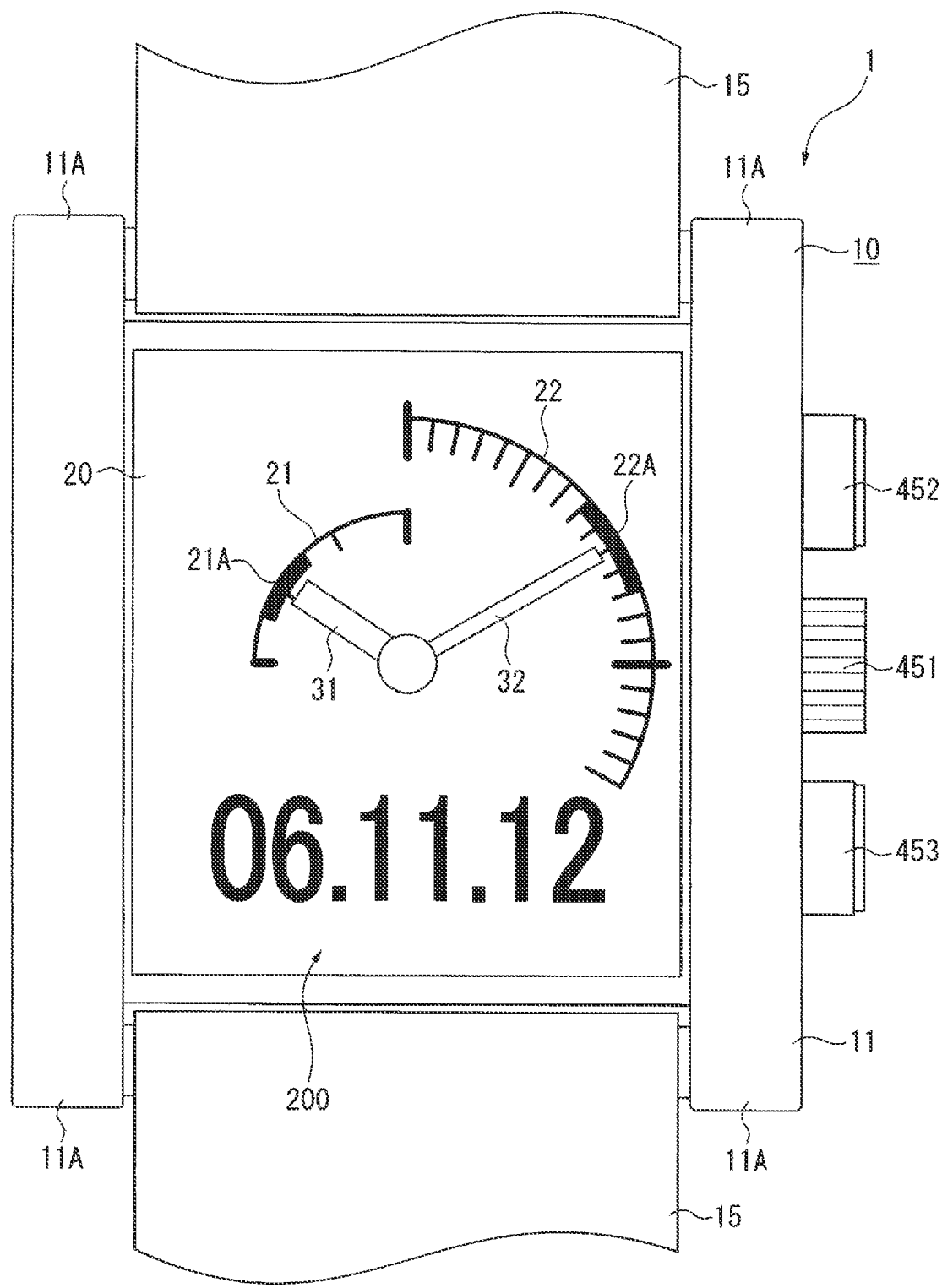
FIG. 12 is a front view of a combination timepiece according to a seventh embodiment of the invention.

More specifically, as shown in FIG. 12, the scale display control means 414A in this embodiment displays the portion 21A and 22A of the scales 21 and 22 corresponding to the current positions pointed to by the hands 31 and 32 using a thicker line width than the other parts of the scales 21 and 22 displayed on the display panel 20. More specifically, the thickness of the arc connecting the graduations 21A, 22A is changed.

The portion 21A, 22A or the scales 21 and 22 that is displayed using a thicker line width is preferably the portion of the arc within a specific range on either side of the time indicated by the hands 31 and 32. When the minute hand 32 moves one minute on the minute hand 32 scale 22 in this case, the scale display control means 414A also preferably moves the portion 22A of the scale 22 displayed with an increased line width one minute.

As the hands 31 and 32 move, the scale display control means 414A can also change the scale portion 21A, 22A that is displayed with a thicker line width. For example, as shown in FIG. 12, when the minute hand 32 points to the range from 8 to 12 minutes, the scale display control means 414A increases the thickness of the scale 22 in the range from 8 to 12 minutes. When the minute hand 32 then moves into the range from 12 to 17 minutes, the scale display control means 414A increases the thickness of the scale 22 in the range from 12 to 17 minutes. The portion of the scale 22 that is displayed with a thicker line width is therefore shifted in five-minute increments every five minutes.

This embodiment of the invention enables the user to easily determine the positions of the hands 31 and 32 and determine the approximate time even if the precise positions of the hands 31 and 32 cannot be determined by displaying a portion of the scales 21 and 22 using a thick line width.

Instead of increasing the line width of a part of the scales 21 and 22, the color of part of the scales 21 and 22 could be changed or both the line width and color can be changed. More particularly, one part of the scales 21 and 22 can be changed so that part can be readily distinguished from the other parts of the scales 21 and 22.

Embodiment 8

Figure 13:
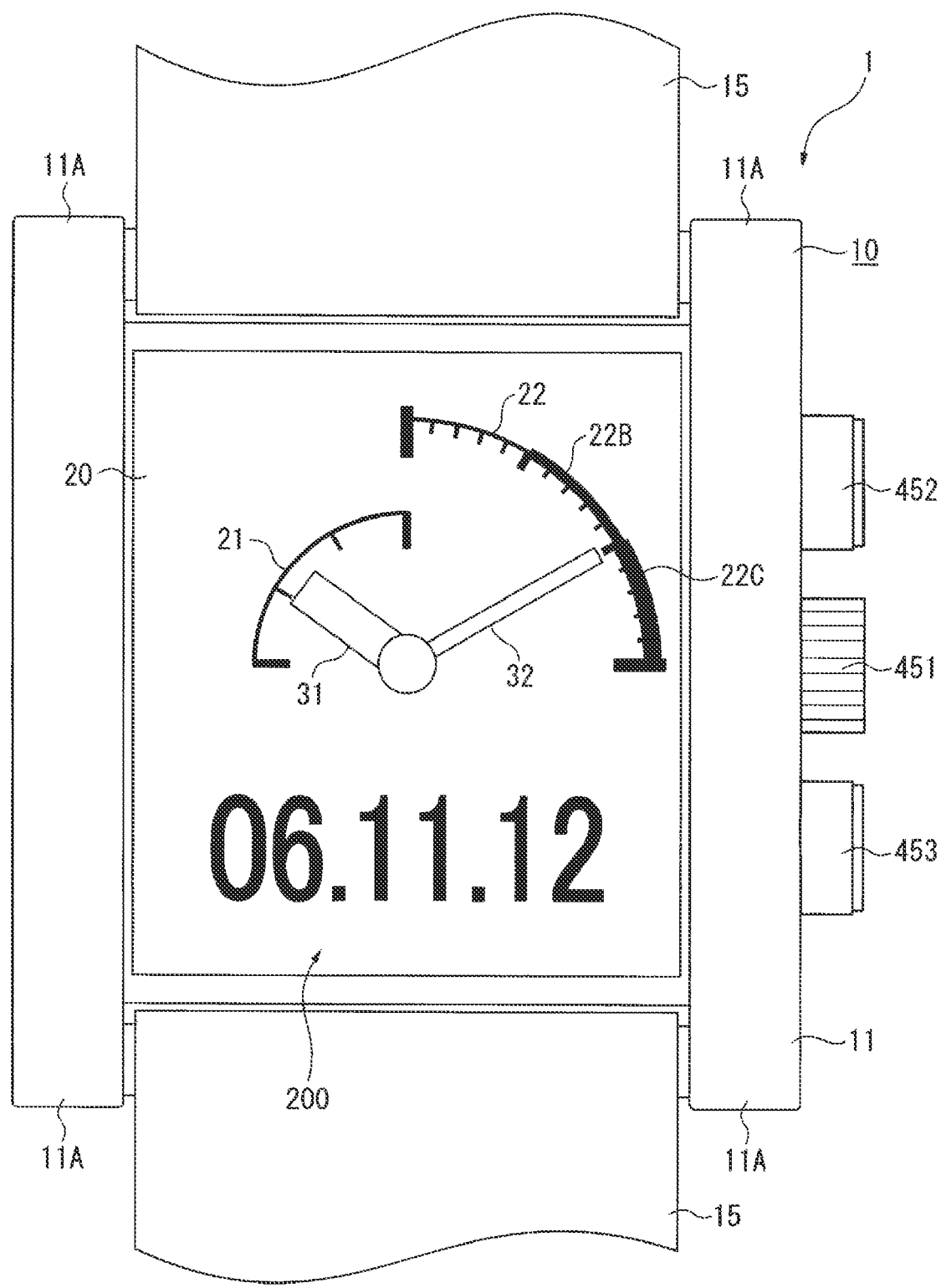
FIG. 13 is a front view of a combination timepiece according to an eighth embodiment of the invention.

An eighth embodiment of the invention is described next. In the seventh embodiment of the invention the thickness of the scales 21 and 22 changes in conjunction with movement of the hands 31 and 32. In this embodiment of the invention, however, the thickness of the scales 21 and 22 is changed as shown in FIG. 13 to give meaning to the time change indicated by the hands 31 and 32.

The scale display control means 414A in this embodiment of the invention updates the scale 22 of the minute hand 32 at a 15-minute interval. More specifically, when the minute hand 32 moves into the 0 to 15 minute range, the 15 to 30 minute range, the 30 to 45 minute range, and the 45 to 60 minute range, the scale display control means 414A shifts the scale 22 to the 0 to 15 minute range, the 15 to 30 minute range, the 30 to 45 minute range, and the 45 to 60 minute range, respectively.

The scale display control means 414A also displays the second five-minute portion 22B (minutes 5 to 10 in FIG. 13) of the scale 22 with a thicker line width than the first five-minute portion, and displays the third five-minute portion 22C (minutes 10 to 15 in FIG. 13) using an even thicker line width.

With this embodiment of the invention the user can easily determine the approximate range of the current time from the thickness of the portion of the scale 22 pointed to by the minute hand 32, and can determine, for example, the progress of a meeting, such as how much time has passed or how much time remains.

Instead of increasing the line width of a part of the scales 21 and 22, the color of part of the scales 21 and 22 could be changed or both the line width and color can be changed. More particularly, one part of the scales 21 and 22 can be changed so that part can be readily distinguished from the other parts of the scales 21 and 22.

Embodiment 9

A ninth embodiment of the invention is described next. This embodiment differs from the first embodiment by displaying a part of the scales 21 and 22 differently from the other part of the scale, but is otherwise identical.

Figure 14:
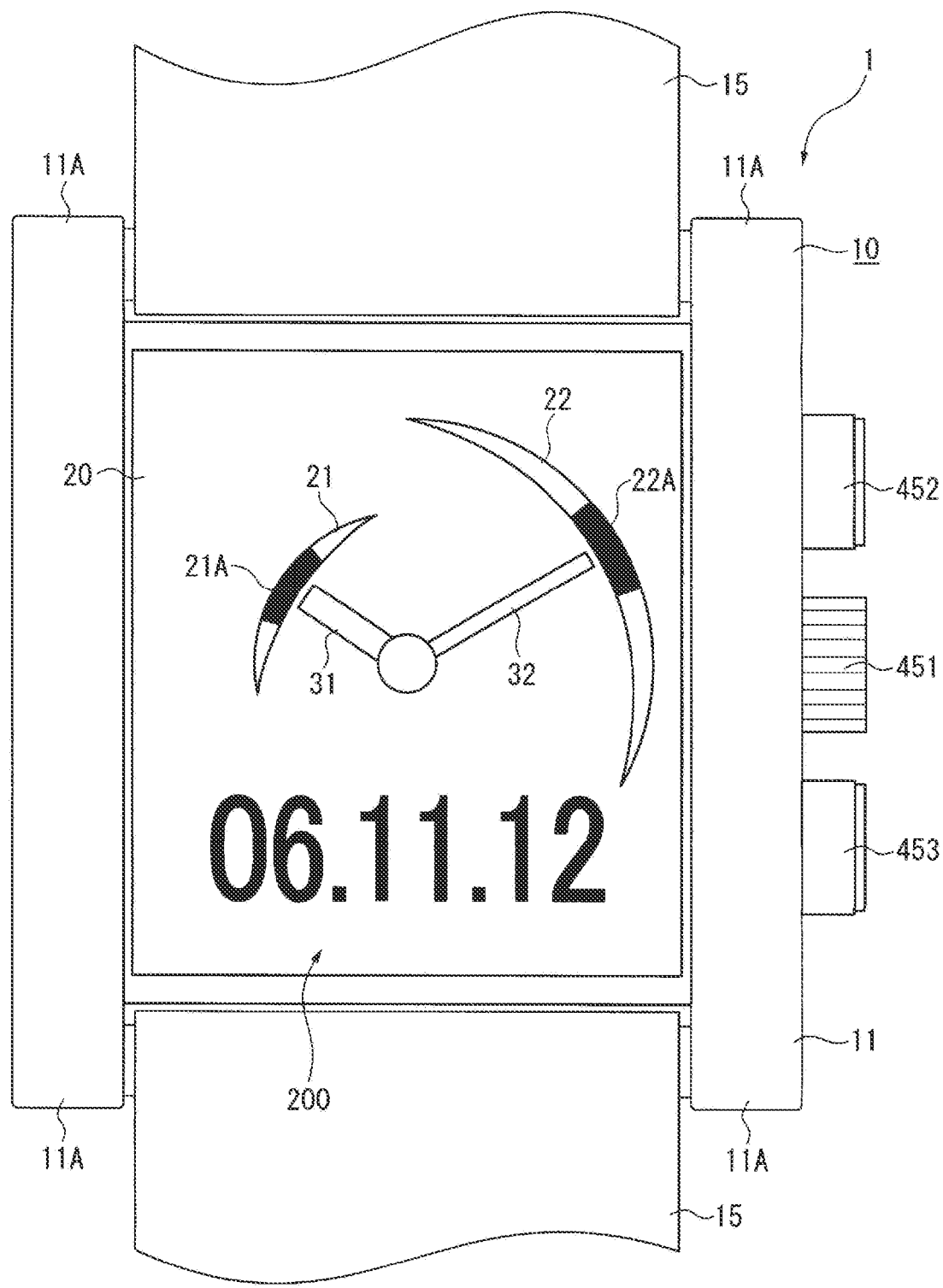
FIG. 14 is a front view of a combination timepiece according to a ninth embodiment of the invention.

More specifically, as shown in FIG. 14, the scale display control means 414A in this embodiment of the invention changes the color of the portion 21A, 21B of the scale 21, 22 corresponding to the current position pointed to by the hands 31 and 32 to a deeper color than the other portions of the scales 21 and 22 presented on the display panel 20.

The parts 21A, 22A of the scales 21 and 22 that re displayed a darker color are preferably specific ranges centered on the times indicated by the hands 31 and 32. In this case the scale display control means 414A also moves the portion of the scale 22 that is displayed using a darker color a 1-minute increment on the minute hand 32 scale 22 when the minute hand 32 moves one minute.

Alternatively, the scale display control means 414A can move the scale portions 21A, 22A that are displayed with a thicker line width a constant amount in conjunction with movement of the hands 31 and 32. As shown in FIG. 14, for example, the scale display control means 414A displays the range of the scale 22 from 8 to 12 minutes using a dark color when the minute hand 32 is pointing in this 8 to 12 minute range, displays the range of the scale 22 from 12 to 17 minutes using a dark color when the minute hand 32 is pointing in this 12 to 17 minute range, and thus shifts the portion of the scale 22 that is displayed with thicker line width in five-minute increments every five minutes.

This embodiment of the invention enables the user to easily determine the positions of the hands 31 and 32 and determine the approximate time even if the precise positions of the hands 31 and 32 cannot be determined by displaying a portion of the scales 21 and 22 using a darker color.

The invention is not limited to increasing the color density of a part of the scale 21 and 22, and can vary the displayed color by appropriately adjusting the hue, saturation, or brightness.

Embodiment 10

Figure 15:
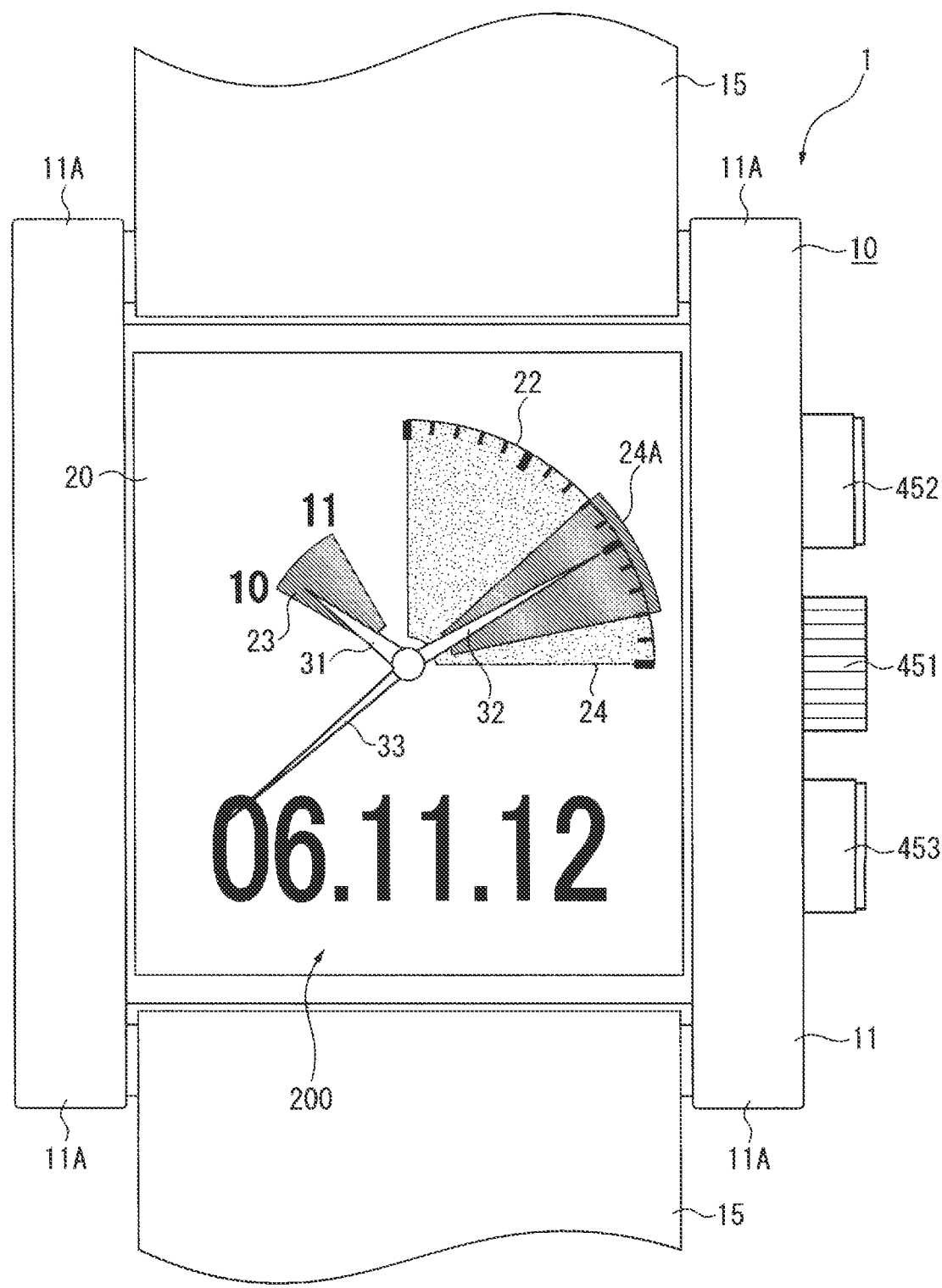
FIG. 15 is a front view of a combination timepiece according to a tenth embodiment of the invention.

A tenth embodiment of the invention is described next. As shown in FIG. 15, this embodiment of the invention uses different colors to display the scale areas 23 and 24 and the no-scale area. In addition, the hour scale area 23 and the minute scale area 24 are displayed using different colors. A fan-shaped hand display range 24A is also set in the minute scale area 24. The color of this hand display range 24A is also different from the colors of the scale areas 23 and 24 and the no-scale area.

The hand display range 24A is also displayed according to the position of the minute hand 32, and the central angle of the hand display range 24A is smaller than the central angle of the minute scale area 24.

This embodiment of the invention also has a second hand 33. Similarly to a typical timepiece, the length of the second hand 33 from the center shaft to the distal end is longer than the length of the minute hand 32 from the center shaft to the distal end. Markers for the second hand 33 are not displayed on the display panel 20.

By displaying the scale areas 23 and 24 and the no-scale area in different colors, this embodiment of the invention makes identifying the scale areas 23 and 24 and determining the current positions of the hands 31 and 32 simple.

Using different colors to display the scale areas 23 and 24 also makes determining the current positions of the hands 31 and 32 simple and makes it easier to determine the approximate time.

Furthermore, by displaying a hand display range 24A that is narrower (has a smaller central angle) than the minute scale area 24 according to the position of the minute hand 32, the position of the minute hand 32 can also be determined more easily based on the position of the hand display range 24A.

The colors of the scale areas 23 and 24 and hand display range 24A can also be set so that the hands 31 and 32 stand out, thereby improving the readability of the hands 31 and 32.

Yet further, this embodiment of the invention has a second hand 33 but does not display a scale (markers) for the second hand. Information displayed in the no-scale area will therefore not be obscured by the second hand scale, and a drop in the readability of displayed information is thus prevented.

In addition, while the second hand 33 passes over the information 200 displayed in the no-scale area as shown in FIG. 15, the second hand 33 travels faster than the minute hand 32 and is typically slender. As a result, even if the second hand 33 passes over the information 200, the second hand 33 will move away from the information 200 in a number of seconds and there is no practical concern about the readability of the information 200 displayed in the no-scale area being impaired.

Other Variations of the Invention

The invention is not limited to the embodiments described above, and all modifications and improvements that are within the scope of the accompanying claims are included in the invention.

For example, the scale display control means 414A can move the scale range and the graduations for each hand a prescribed number of graduations in the direction the hands move each time the hands move a prescribed number of graduations. This prescribed number of graduations could be one graduation or two or more graduations.

Using the scale 22 for the minute hand 32 for example, when the minute hand 32 moves one minute (a 6° angle of rotation), each of the graduations on the scale 22 can be moved one graduation by shifting the minute scale area 24, that is, the scale 22, the distance of one graduation (a 6° angle of rotation).

This has the advantage of always keeping the hand pointing to the center of the corresponding scale. If the scale for the minute hand 32 is updated in this way, however, the scale must be redrawn more frequently, specifically every minute, thereby increasing power consumption if an electrophoretic display or other display device with image memory is used for the display panel 20, and the embodiments described above are therefore preferable for the ability to reduce power consumption.

If the scale is shifted two or more graduations, the minute hand 32 scale 22, for example, is preferably shifted from 4 to 30 graduations at a time. Moving the scale 22 less than four graduations requires updating the scale display more frequently and thus increases power consumption. If the scale 22 is moved in increments of 30 graduations or more, the scale 22 must display at least 30 graduations, and the size of the no-scale area is accordingly reduced.

Alternatively, the scale display control means 414A can move the scale area of the hand a prescribed distance in the direction the hand move at a constant time interval. While the speed of hand or needle movement in an instrumentation meter is not constant, the hands on a timepiece move at a constant rate. As a result, if the scales for the hour hand 31, minute hand 32, and second hand 33 of a timepiece are moved at a regular time interval, the scale, that is, the graduations (markers), can be displayed according to the positions of the hands. For example, if the minute scale area 24 in which the scale 22 for the minute hand 32 is displayed is rotated 30 degrees every 5 minutes, the scale 22 can be displayed linked to the movement of the scale 22.

Preferably, the update-display interval for each of the scales is equal to the refresh display interval of the display panel 20, and the distance the graduations move is set according to the update-display interval. The refresh display interval of the display panel 20 having image memory is 5, 10, 15, or 30 minutes, for example. Although the amount of power consumed is a small fraction of the power consumed when normally redrawing the entire display, refreshing the display to prevent image degradation still consumes power. As a result, updating the display of the scales at a different time than when the display is refreshed increases power consumption commensurately.

Executing the display refresh operation and the scale display updating operation at the same time, however, reduces power consumption.

The scale display control means 414A can also change the update-display interval of the scales and the refresh display interval based on the time (internal time) of the timekeeping means.

For example, the user of the timepiece 1 normally checks the time frequently during the day but removes the timepiece 1 at night and therefore usually does not check the time on the timepiece 1. A drop in the image quality of the display panel 20 at night is therefore not much of a problem, and the refresh display interval can be increased.

The scale display control means 414A therefore sets the refresh display interval to 30 minutes and changes the center angle of the minute hand 32 scale 22 to 180 degrees, that is, a 30-minute scale, during the night (such as from 11:00 p.m. to 7:00 a.m.), and at other times (such as from 7:00 a.m. to 11:00 p.m.) sets the refresh display interval to 15 minutes and changes the center angle of the minute hand 32 scale 22 to 90 degrees, that is, a 15-minute scale.

By thus using a longer refresh display interval at night, when a drop in the contrast of the graduations is not a problem, than during the day, this aspect of the invention can reduce power consumption.

The update-display interval of the scales and the refresh display interval can alternatively be changed based on user activity instead of based on the internal time kept by the timepiece 1. For example, if the timepiece is a wristwatch the timepiece could detect when the timepiece is worn on the user's wrist, shorten these intervals when the wristwatch is being worn, and lengthen the intervals when the wristwatch is not worn.

Methods of detecting if the wristwatch is being worn include, for example, detecting movement of the timepiece by means of an acceleration sensor disposed inside the timepiece, or detecting the power output of an internal generator when a thermoelectric or rotary pendulum generator is built in to the timepiece, to determine if the timepiece is being worn by the user.

The color of the scale can also be changed when a scale is updated. For example, if the minute hand 32 scale 22 is updated at a 15-minute interval, the scale 22 could be black when in the 0 to 15 minute range, blue when changed to a scale 22 in the 15 to 30 minute range, yellow when changed to a scale 22 in the 30 to 45 minute range, and red when changed to a scale 22 in the 45 to 60 minute range. This arrangement enables the user to determine the current time range indicated by the minute hand 32 and thus easily determine the general progress of a meeting, for example, from the color of the scale 22.

The angles set as the center angle θ1 of the hour scale area 23 and the center angle θ2 of the minute scale area 24 are not limited to the angles described in the first to fourth embodiments above and can be set appropriately according to the embodiment.

For example, if there is only one hand (needle), the center angle of the scale area could be enlarged to 270 degrees. This still leaves a remaining area that can be used to display information, and assures the readability of the displayed information.

However, if there are two hands and the scale for each has a center angle of 180 degrees or more, the entire scale display area will be occupied by the scales when the angle of intersection between the two hands is 180 degrees, that is, when the hands are on diametrically opposite sides of the rotational axis, and assuring space for displaying other information is difficult. The center angles of the scale areas when there are two hands is therefore preferably 120 degrees or less, and is further preferably 90 degrees or less, in order to assure a sufficiently large no-scale area. If there are three hands, the center angle of the scale area is less than or equal to 90 degrees, and the hands are 120 degrees apart, the no-scale area will be divided into several small areas between the scales, and any additional information must be displayed using these small no-scale areas. As described in the second embodiment, it is preferable in this case to use short hands for the third and additional hands so that the hands do not interfere with displaying information.

The center angle of the scale for each hand can be set to 30 degrees or less, but few graduations can be displayed and reading the values indicated by the hands becomes difficult if the scale is too small. The size or center angle of the scale is therefore preferably set with consideration for the graduation interval and the readability of the hands.

In the foregoing embodiments of the invention the graduations are displayed along the outside circumference (arc) of the scale area, but the graduations can be displayed in another part of a fan-shaped scale area. For example, the graduations can be displayed in the middle of the radius of the scale area (the middle area between the center axis and the arc), that is, overlapping the middle area between the rotational axis and the distal end of the hand.

Furthermore, the scale area is fan-shaped because it is used with a rotating hand or needle, but the shape, size, and other aspects of the scale area can be set appropriately according to how the hand moves. For example, if the needle slides along a linear path, the scale area can be a band along the path.

Further alternatively the scale area can be rendered only in the area along the distal end of the hand, and the area near the proximal end of the hand can be set as the no-scale area. For example, the scale area of a rotating hand is not limited to a fan-shaped area and could be a curved band or arch-shaped scale area. More specifically, the scale area can be any area with enough area to display at least the graduations needed to read the value indicated by the hand.

The display panel 20 could also display numbers for reading the graduations adjacent to the graduations displayed in the scales 21, 22, 27, 104, and 105 shown in the figures. As shown in FIG. 6, for example, the number "10" denoting the hour indicated by the hour hand is displayed beside the corresponding scale 21. Also displaying the numbers makes it even easier to determine the value indicated by the hand.

The information displayed in the no-scale area of the display panel 20 is also not limited to the information described above, and could include, for example, the date, world time, a chronograph, schedule information, a to-do list, address book information, and other types of information.

Furthermore, when a second hand is not provided as in the first embodiment, the second could be displayed as this additional information on the display panel 20.

Further alternatively, a wireless or wired communication function can be rendered in the dial indicator display device, and information received by the communication function, such as e-mail or news, could be displayed on the display panel 20.

It is also not essential to display information using the information display control means 414B. More particularly, the scale display control means 414A alone could be rendered in the display panel drive circuit 414 to display only the scale graduations on the display panel 20.

Further alternatively, the user could be enabled to select a mode that displays information and a mode that displays only the scale without displaying additional information. If the mode displaying only the scale is selected, the graduations can be displayed in a full circle similarly to a conventional analog timepiece so that the values indicated by the hour hand 31, minute hand 32, and second hand 33 can be read accurately.

The second embodiment of the invention displays a scale 27 around the entire circumference of the second hand scale display range 28, but a fan-shaped second hand scale area can be set inside the second hand scale display range 28 and the scale 27 could be displayed only in this scale area similarly to the scales displayed for the hour hand 31 and minute hand 32.

The display panel 20 is also not limited to a display device with image memory such as an electrophoretic display, and an liquid crystal display, organic electroluminescent display, or other type of display device can be used instead.

More particularly, when the display must be redrawn frequently to update the second hand scale or the scale on a measuring instrument, a liquid crystal display is preferably because of the fast response time when redrawing the display.

If the display panel 20 is an electrophoretic display, however, the scale can be displayed quickly in conjunction with movement of the hand by applying a certain amount of voltage to the parts of the scale that are adjacent to the currently displayed scale, that is, the part of the scale that is likely to be displayed next, to display that part of the scale at an intermediate gray level. For example, if an EPD that can display multiple gray levels between black and white is used and the scale is displayed black, and the part of the scale that is to be displayed black next is driven to an intermediate gray level, the scale can be quickly redrawn to track the movement of a fast-moving hand, such as the second hand, by then applying additional voltage to immediately display black.

The information displayed in the no-scale area can also be linked to the scale area.

For example, timepieces that have a solar power generator or other type of built-in generating device and display information related to power generation using the second hand 33 are known from the literature. When the second hand 33 indicates power generating information in this case, the displayed content can be differentiated by changing the color or thickness of the indicated graduation or by changing the color of the scale area. The scale in the indicated area could be green if the power output level is high, for example, and could be changed to red when power output is low, thus enabling the user to easily determine the power output level. The meaning of the color of the scale could also be displayed with text in the no-scale area. The user can also easily know that the displayed text information is related to the value indicated by the hand if the same color used to display the graduations and scale is used to display the text information.

This information is also not limited to power generation, and the user can easily recognize the displayed information by controlling the color of the scale and the color of the information in the no-scale area, whether the information indicates the temperature, detection of a magnetic field, or other internal state of the timepiece, operation of the crown 451 or buttons 452 and 453, or information that is received from an external source by wire or wirelessly and is stored in the timepiece.

The invention is not limited to use in timepieces, speedometers, or thermometers as described in the foregoing embodiments, and can be used in a wide range of instruments and meters. More particularly, because the displayed scale can be freely changed, the invention can also be used to switch between the scales used by plural different types of instruments.

The invention can also be used in a timepiece that has a small second hand attached to a pin that is offset from the pin to which the hour hand and minute hand are attached. In this case the scale display control means can set a small second hand scale range for the small second hand, and can control displaying and not displaying the scale in the small second hand scale range in conjunction with the information display.

The invention being thus described, it will be obvious that it may be varied in many ways. Such variations are not to be regarded as a departure from the spirit and scope of the invention, and all such modifications as would be obvious to one skilled in the art are intended to be included within the scope of the following claims.

What is claimed is:

1. A dial indicator display device comprising:
a plurality of needle indicators;
a needle moving means for moving the plurality of needle indicators;
a display panel disposed behind the plurality of needle indicators and capable of displaying an image; and
a drive control means for controlling the needle moving means and driving the display panel, and including
a scale display control means for displaying a plurality of scales, one for each of the plurality of needle indicators, in respective scale display areas on the display panel,
a needle position detection means for detecting the position of each of the plurality of needle indicators, and
an information display means;
wherein the scale display control means segments each scale display area into a scale area and a no-scale area not including the scale area based on the position of the corresponding needle detected by the needle position detection means, and displays the scale for each needle indicator for reading values indicated by the corresponding needle indicator only in the corresponding scale area, the segmenting and setting of each scale display area being done independently of one another; and
the information display means displays information in the no-scale area.

2. The dial indicator display device described in claim 1, wherein:
each needle indicator is attached to a rotary pin that is driven rotationally by the needle moving means;
at least on of the scale display areas is formed in a circle concentric to the rotary pin of the corresponding needle indicator; and
at least one of the scale areas is a fan-shaped portion of the corresponding scale display area connecting an outside circumference arc of the scale display area and the center of the circle.

3. The dial indicator display device described in claim 2, wherein:
at least one of the scale areas has a center angle set in the range from 30degrees to 270 degrees.

4. The dial indicator display device described in claim 1, wherein:
the display panel is a display device with image memory;
the drive control means runs a refresh display operation to correct for image degradation on the display panel at a prescribed refresh display interval; and
the scale display control means moves each scale area a prescribed amount that is set according to the refresh display interval in the same direction as the corresponding needle indicator moves at the same interval as the refresh display interval.

5. The dial indicator display device described in claim 4, further comprising:
a timekeeping means for keeping time;
wherein the plurality of needle indicators includes an hour hand and a minute hand;
the drive control means controls the needle moving means based on the time information kept by the timekeeping means to move the hour hand and the minute hand;
the scale display control means sets an hour hand scale area for the hour hand and a minute hand scale area for the minute hand, and displays a scale in each scale area; and
the drive control means changes the refresh display interval based on the time kept by the timekeeping means.

* * * * *